US009801029B2

(12) United States Patent
Liu et al.

(10) Patent No.: US 9,801,029 B2
(45) Date of Patent: Oct. 24, 2017

(54) METHOD, SYSTEM AND DEVICE FOR TRANSMITTING DATA

(71) Applicant: China Academy of Telecommunications Technology, Beijing (CN)

(72) Inventors: Jianhua Liu, Beijing (CN); Dong Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 100 days.

(21) Appl. No.: 14/439,666

(22) PCT Filed: Jul. 31, 2013

(86) PCT No.: PCT/CN2013/080557
§ 371 (c)(1),
(2) Date: Apr. 30, 2015

(87) PCT Pub. No.: WO2014/067303
PCT Pub. Date: May 8, 2014

(65) Prior Publication Data
US 2015/0304821 A1 Oct. 22, 2015

(30) Foreign Application Priority Data
Nov. 2, 2012 (CN) .......................... 2012 1 0433962

(51) Int. Cl.
*H04W 4/06* (2009.01)
*H04W 16/14* (2009.01)
(Continued)

(52) U.S. Cl.
CPC ............. *H04W 4/06* (2013.01); *H04W 16/14* (2013.01); *H04W 72/005* (2013.01); *H04W 72/1278* (2013.01)

(58) Field of Classification Search
None
See application file for complete search history.

(56) References Cited

U.S. PATENT DOCUMENTS

2008/0291866 A1 11/2008 Fukui
2011/0249633 A1* 10/2011 Hong .................... H04L 5/0053
370/329

(Continued)

FOREIGN PATENT DOCUMENTS

CN 1921689 A 2/2007
CN 101316133 A 12/2008

(Continued)

OTHER PUBLICATIONS

International Search Report for PCT/CN2013/080557.
The Extended European Search Report dated Nov. 4, 2015 in the EP counterpart application (13851568.9).

*Primary Examiner* — Mohammad Adhami
(74) *Attorney, Agent, or Firm* — Kilpatrick Townsend & Stockton LLP

(57) ABSTRACT

The embodiments of the present application relate to the technical field of wireless communications, and in particular, to a method, system and device for transmitting data, so as to solve the problems existing in the prior art that a multicast message cannot be sent due to FACH limitation in a UMTS system, and a relatively large influence will be brought to the current system information scheduling mechanism if multicast data is issued through system information in an LTE system. The method of the embodiments of the present application comprises: a wireless access network receiving data of at least one group of user equipment from a core network, and the wireless access network transmitting data of a corresponding group to the user equipment in the group through user plane shared resource transmission. Due to this mode of adopting a shared channel (Continued)

to bear multicast data, the current relatively limited FACH resource in a UMTS system is thereby released, and the adoption of a shared channel can enable transfer of multicast data more rapidly and promptly. An LTE adopts a user plane to transmit multicast data, avoiding influence on the system information.

14 Claims, 10 Drawing Sheets

(51) Int. Cl.
*H04W 72/00* (2009.01)
*H04W 72/12* (2009.01)

(56) References Cited

U.S. PATENT DOCUMENTS

| | | | | |
|---|---|---|---|---|
| 2012/0302240 A1* | 11/2012 | Tamaki | ............ | H04W 36/0011 |
| | | | | 455/436 |
| 2013/0194999 A1* | 8/2013 | Anchan | ............... | H04W 76/002 |
| | | | | 370/312 |
| 2013/0286957 A1* | 10/2013 | Bucknell | ............... | H04W 4/005 |
| | | | | 370/329 |
| 2014/0161016 A1* | 6/2014 | Morioka | ............... | H04L 1/1861 |
| | | | | 370/312 |

FOREIGN PATENT DOCUMENTS

| | | | |
|---|---|---|---|
| CN | 101998274 A | | 3/2011 |
| EP | 2469953 A1 | | 6/2012 |
| WO | 2010/124415 A1 | | 11/2010 |

* cited by examiner

METHOD, SYSTEM AND DEVICE FOR TRANSMITTING DATA

The present application is a US National Stage of International Application No. PCT/CN2013/080557, filed Jul. 31, 2013, designating the United States, and claiming the benefit of Chinese Patent Application No. 201210433962.7, filed with the Chinese Patent Office on Nov. 2, 2012 and entitled "Method, system and device for transmitting data", which is hereby incorporated by reference in its entirety.

FIELD

The present disclosure relates to the field of wireless communications and particularly to a method, system and device for transmitting data.

BACKGROUND

Machine-Type Communication (MTC) which is a new communication concept is intended to organic combine various types of communication technologies, e.g., machine to machine communication, machine-controlled communication, human-machine interactive communication, mobile communication over the Internet, etc., to thereby drive the development of social production and life styles. Future human-to-human communication traffic is expected to potentially account for only ⅓ of the entire market of User Equipments (UEs), and MTC communication traffic is expected to account for a larger share of communications. MTC communication is also referred to as Machine-to-Machine (M2M) communication or the Internet of things.

The existing mobile communication network is designed, for example, the capacity of the network is determined, etc., for human-to-human communication. If the mobile communication network is required to support MTC communication, then the mechanism of the mobile communication system needs to be optimized according to the characteristic of MTC communication for the purpose of better MTC communication with little or no influence upon traditional human-to-human communication.

A Cell Broadcast Service (CBS) is a mechanism supported by both the existing Universal Mobile Telecommunication System Terrestrial Radio Access Network (UTRAN) system and the existing Global System for Mobile Communications (GSM) to broadcast the same contents to UEs in some area. The CBS involves entities including a Cell Broadcast Center (CBC) and a Cell Broadcast Entity (CBE), where the CBC is regarded as an entity in a core network. The broadcasted contents are referred to as CBS information generated by the CBE. The CBS information is broadcasted in a predefined area referred to as a CBS service area. The CBS service area may include one cell or several cells or even the entire Public Land Mobile Network (PLMN). The CBS service area is determined by the subscription of an information provider with a network operator and notified by the CBC to the Radio Access Network (RAN) side. The CBS information is broadcasted without any acknowledgment.

The warning message delivery technology is currently supported in the Long Term Evolution (LTE) system. Within this technology which has similar mechanism with the CBS, warning information without any acknowledgement can also be transmitted to UEs in a specific area. At the RAN side, the UEs need to obtain the warning information broadcasted by the network side by obtaining a system message or by obtaining the system message as triggered by a paging message.

In the UMTS system, downlink broadcast data is transmitted over a Control Traffic Channel (CTCH), and carried respectively over a Forward Access Channel (FACH) and a Secondary Common Control Physical Channel (SCCPCH) among transport channels and physical channels, in the existing CBS mechanism. Due to limited capacities of the FACH and the SCCPCH, a significant amount of downlink data is transmitted with a risk of an unsatisfactory Quality of Service (QoS); and also a random access setup message is carried over the FACH, and when an FACH resource is occupied by CTCH traffic, there are less resources of the FACH available to a random access, thus lowering the success ratio of an access by a UE. If transmission is performed with group-cast also in the CBS mechanism, then the FACH resources may be further limited.

In the LTE system, there is currently only a mechanism for transmitting a warning message as system information. If group-cast data is also transmitted as system information, then there will be inevitably a significant influence on the existing mechanism for scheduling system information, so that the system information may be scheduled and updated out of order when there is frequent group-cast, thus making it complex for the UE to fetch the system information.

In summary, in the UMTS system, a group-cast message can not be transmitted due to the limited FACH; and in the LTE system, if group-cast data is transmitted as system information, then there may be significant influence upon the existing mechanism for scheduling system information.

SUMMARY

Embodiments of the disclosure provide a method, system and device for transmitting data so as to address the problem in the prior art that in the UMTS system, a group-cast message can not be transmitted due to the limited FACH; and in the LTE system, if group-cast data is transmitted as system information, then there may be significant influence upon the existing mechanism for scheduling system information.

An embodiment of the disclosure provides a method for transmitting data, the method including:

receiving, by a radio access network, data of at least one group of User Equipments (UEs) from a core network; and transmitting, by the radio access network, data of a group to UEs in a corresponding group over a user plane shared resource.

An embodiment of the disclosure provides another method for transmitting data, the method including:

determining, by a UE, a group to which the UE belongs; and receiving, by the UE, data of the group, to which the UE belongs, from the network side over a user plane shared resource.

An embodiment of the disclosure provides a radio access network device for transmitting data, the radio access network device including:

a first receiving module configured to receive data of at least one group of UEs from a core network; and a transmitting module configured to transmit data of a group to UEs in a corresponding group over a user plane shared resource.

An embodiment of the disclosure provides a UE for transmitting data, the UE including:

a determining module configured to determine a group to which the UE belongs; and a second receiving module configured to receive data of the group, to which the UE belongs, from the network side over a user plane shared resource.

An embodiment of the disclosure provides a system for transmitting data, the system including:

a radio access network device configured to receive data of at least one group of UEs from a core network and to transmit data of a group to a UE in a corresponding group over a user plane shared resource; and the UE configured to determine the group to which the UE belongs and to receive the data of the group, to which the UE belongs, from the network side over the user plane shared resource.

In the embodiments of the disclosure, the data of the group is transmitted to the UEs in the corresponding group over the user plane shared resource in the radio access network, and since the group-cast data is carried over the shared channel, the currently limited FACH resource in the UMTS system can be released, and the group-cast data can be transported in a quicker and timely manner over the shared channel; and the group-cast data can be transmitted in the user plane of the LTE to thereby avoid an influence upon the system information.

DETAILED DESCRIPTION

Figure 1:
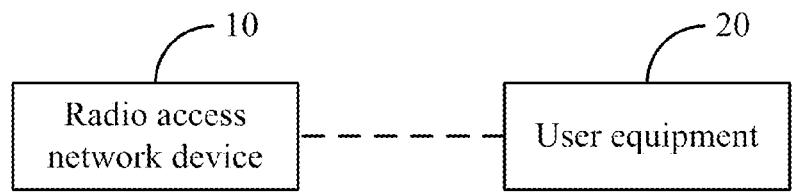
FIG. 1 illustrates a schematic structural diagram of a system for transmitting data according to an embodiment of the disclosure.

In embodiments of the disclosure, data of a group is transmitted to UEs in the corresponding group over a user plane shared resource in a radio access network, and since the group-cast data is carried over the shared channel, the currently limited FACH resource in the UMTS system can be released, and the group-cast data can be transported in a quicker and timely manner over the shared channel; and the group-cast data can be transmitted in the user plane of the LTE to thereby avoid an influence upon the system information. Also the disclosure can transmit the group-cast data for the UEs in the specific group to thereby avoid a misoperation by and excessive power consumption of a UE in a non-associated group.

For transmitting group service data via a CBS related interface or message (Iu-BC for the UMTS, and a write-replace procedure via an S1 interface for the LTE) over a core network, downlink data of one or more groups of UEs is transmitted by being carried over a shared resource in the user plane over the radio access network, and the UEs in the group or groups fetch scheduling information only on a specific occasion and fetch the data of the group transmitted over the corresponding shared channel under some rule according to the scheduling information. When a CBC initiates a request for group-cast data, an indicator carried in a corresponding interface message (Iu-BC for the UMTS, and a write-replace procedure via an S1 interface for the LTE) notifies the access network that the data is transmitted over the user plane shared resource.

Here the S1 interface is a logical interface set up between a radio access network node and a core network node.

In the UMTS system, the group-cast data is transmitted over a logical channel CTCH, and carried respectively over a High Speed Downlink Shared Channel (HS-DSCH) and a High Speed Physical Downlink Shared Channel (HS-PDSCH) among transport channels and physical channels, and the UEs in the group or groups fetch the scheduling information at the specific occasion configured by a Paging Indicator (PI) or a system message.

In the LTE system, the group-cast data is transmitted over a newly defined logical channel, i.e., a Group Traffic Channel (GTCH), and carried respectively over a DL-SCH and a Physical Downlink Control Channel (PDCCH)/Physical Downlink Shared Channel (PDSCH) among transport channels and physical channels; and also a Broadcast/Multicast Control (BMC)-like function entity or module is introduced to the user plane to handle data buffering, scheduling and other functions; and the UEs in the group or groups fetch the scheduling information on the specific occasion configured by a system message.

The embodiments of the disclosure will be described below in further details with reference to the drawings.

In the following description, firstly an implementation with cooperation of the network side and the UE side will be described, and then implementations at the network side and the UE side will be described respectively, but this will not suggest required cooperation of both the sides for an implementation, and in fact, problems encountered respectively at the network side and the UE side will also be addressed in the separate implementations at the network side and the UE side, although a better technical effect can be achieved in the implementation with cooperation of both the sides.

As illustrated in FIG. 1, a system for transmitting data according to an embodiment of the disclosure includes a radio access network device 10 and a UE 20.

The radio access network device 10 is configured to receive data of at least one group of UEs from a core network and to transmit data of a group to a UE 20 in the corresponding group over a user plane shared resource; and The UE 20 is configured to determine the group to which the UE belongs and to receive the data of the group, to which the UE belongs, from the network side over the user plane shared resource.

Different transmission approaches applicable to different systems will be described below respectively.

I. MUTS System

Figure 2:
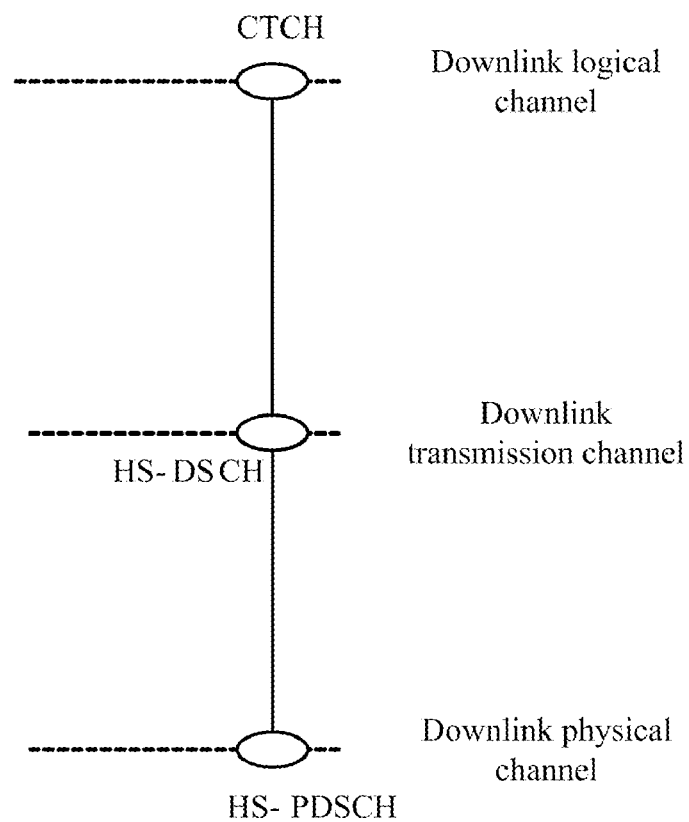
FIG. 2 illustrates a schematic diagram of mapping of a shared channel in a UMTS system according to an embodiment of the disclosure.

In the UMTS system, mapping of CTCH data can be carried over an HS-DSCH/HS-PDSCH particularly as illustrated in FIG. 2.

Figure 3:
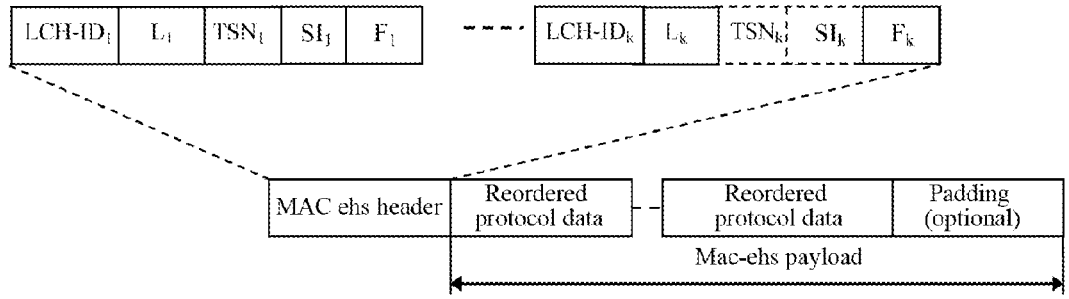
FIG. 3 illustrates a schematic structural diagram of an MAC-ehs PDU according to an embodiment of the disclosure.

In this mapping approach, a Medium Access Control for Enhanced HS-DSCH Protocol Data Unit (MAC-ehs PDU) is transmitted at the MAC layer as illustrated in FIG. 3. After the CTCH is mapped to the HS-DSCH, the value of a logical Channel Identifier (LCH-ID) in an MAC-ehs header needs to be redefined. For the CTCH, the LCH-ID be represented as 1111 (or other bit information) and distinguished from a Broadcast Control Channel (BCCH) and a Paging Control Channel (PCCH) by a group specific occasion configured by a group specific PI or a system message. That is, when a Shared Control Channel for a High Speed-Downlink Shared Channel (HS-DSCH) (HS-SCCH) scrambled by pre-configured HS-DSCH data or a group specific HS-DSCH Radio Network Temporary Identity (H-RNTI) is received by the group specific PI or on the group specific occasion, if the LCH-ID is indication information to indicate that a subsequent payload is data of a CTCH channel, then the subsequent payload is determined to be the data of the CTCH channel.

In an implementation, the indication information, included in the MAC-ehs PDU to indicate that the subsequent payload is data of a CTCH channel, can be a currently undefined value or a null value; or can be a currently defined value and distinguished by a resource over which the MAC-ehs PDU is transmitted.

For example, if 1111 represents a currently defined value, then the UE receives the MAC-ehs PDU by the group specific PI at the paging specific occasion location and the PI location, and if the LCH-ID is 1111, then it is determined that 1111 indicates that the subsequent payload is data of a CTCH channel; or The UE receives the pre-configured HS-DSCH data including the MAC-ehs PDU on the group specific occasion at the paging specific occasion location and the PI location, and if the LCH-ID is 1111, then it is determined that 1111 indicates that the subsequent payload is data of a CTCH channel; or The UE receives the HS-PDSCH data including the MAC-ehs PDU, over an HS-SCCH scrambled by a group specific H-RNTI, by the group specific PI or on the group specific occasion at the paging specific occasion location and the PI location, and if the LCH-ID is 1111, then it is determined that 1111 indicates that the subsequent payload is data of a CTCH channel.

With an Iub interface, the CTCH data can be transmitted in an HS-DSCH FP frame carrying a Connection Frame Number (CFN) which is a frame number corresponding to a System Frame Number (SFN) calculated by an RNC in Equation 1 or Equation 4, where this field indicates to an instance of time when an NB (Node B) transmits the FP frame carrying the data.

$$SFN=(K+m*N) \qquad \text{Equation 1,}$$

Where N represents a periodicity at which a CTCH reoccurs, K represents an offset of the CBS frame, and m represents zero or a positive integer satisfying K+MN≤MaxSFN. M represents a Transmission Time Interval (TTI) at which the CTCH is mapped to the FACH, MaxSFN represents the maximum of the SFN, and N and K in Equation 1 can be broadcasted in a System Information Block (SIB) 5/SIB 6.

With an Iu for Broadcast Control (Iu-BC) interface, when the CBC initiates a request for the group-cast data, the CBC can notify the RNC in a write-replace or another message that the data of the group is transmitted over the user plane shared resource and also notify the RNC of information identifying the group, e.g., a group ID, a message ID associated with the group ID, etc. The RNC can judge from the information that the currently broadcasted data is the data of the group and can know the range of the group to which the data is broadcasted.

Furthermore the radio access network device 10 and the UE 20 can judge from the group specific PI or the pre-configured group specific occasion whether to fetch the scheduling information over the HS-SDCH channel.

In a first approach, it is judged from the group specific PI whether to fetch the scheduling information over the HS-SDCH channel:

The network side and the UE calculate the group paging occasion and PI locations using the same group identifier (Group_ID) particularly in the following equation, where the UE can obtain the group identifier upon subscription.

The UE obtains the Paging Indicator Channel (PICH) location of the group:

$$\text{The group specific paging occasion} = \{(Group\_ID \text{ div } K) \bmod (\text{the } DRX \text{ cycle length div } PBP)\} * PBP + n * DRX \text{ cycle length} + \text{Frame Offset} \qquad \text{Equation 2;}$$

Where n=0, 1, 2 . . . ; K represents the number of allocated PICHs; the DRX cycle length represents a paging DRX periodicity equal to a MAX(2k, PBP) radio frame; PBP represents the configured PICH periodicity; the Frame Offset represents the configured offset; and the Group_ID represents the group ID. All of K, k, PBP and Frame Offset can be configured for the UE as system information, and the Group_ID can be notified in the subscription to the UE and the network.

The UE obtains the location of the PI factor of the group:

$$\text{The group specific } PI = DRX \text{ Index} \bmod Np \qquad \text{Equation 3;}$$

Where the DRX Index=Group_ID div 8192, and Np can be 88, 44 and 22 dependent upon a physical layer spread modulation scheme.

When the UE detects the all-1 PI factor of the group, the UE receives the scheduling information over the HS-PDSCH channel according to a pre-configured timing relationship, where the scheduling information carries the ID, the starting occasion, the transmission length, the sub-frame configuration, and retransmission or not, of each Cell Broadcast (CB) data message of the next CBS scheduling periodicity, the location of the next piece of scheduling information, and other information.

In a second approach, it is judged from the pre-configured group specific occasion whether to fetch the scheduling information over the HS-SDCH channel:

The network side pre-configures group specific occasions of the respective groups in a system message, and the UEs in the groups detect the scheduling information over the HS-PDSCH channel only on the occasions of the specific groups. Upon reception of the CBS information transmitted by the CBC, the RNC transmits the scheduling information only at the detection locations corresponding to the respective groups and also transmits the CBS information according to the contents of the scheduling information. The group specific occasion can be derived in the equation of:

$$SFN = K + (m*P + (Group\_ID \bmod P))*N \quad \text{Equation 4};$$

Where N represents the periodicity at which the CTCH reoccurs, K represents the offset of the CBS frame, and m represents zero or a positive integer satisfying K+(M*P+ (Group_ID mod P))*N≤MaxSFN. M represents the TTI at which the CTCH is mapped to the HS-DSCH, and MaxSFN represents the maximum of the SFN. P represents the periodicity at which the scheduling information occurs, and the Group_ID represents such an identifier of the group that is configured to the UE upon subscription. With Equation 4, each group can detect separately the scheduling information of the group to thereby free the group from unnecessary decoding and save power of the UE.

The scheduling information carries the ID, the starting occasion, the transmission length, and retransmission or not, of each CB data message of the next CBS scheduling periodicity, the starting instance of time of the retransmitted message, and other information.

For the MUTS system, the radio access network device includes a Radio Network Controller (RNC) and an NB.

The RNC receives data of at least one group of UEs from the core network via an IuBC interface; and The RNC transmits the data of the at least one group of UEs and the corresponding scheduling information to the NB via an Iub interface to instruct the NB to transmit the scheduling information, and the data of the at least one group of UEs to the UEs over a CTCH.

In an implementation, the RNC receives a message from the core network to request for initiating group-cast, where the message includes the information to instruct the data to be transmitted over the shared resource, the information to identify the group, and the data of the at least one group of UEs.

There are a number of transmission approaches in the UMTS system.

In a first transmission approach, the CTCH data is transmitted over a fixed HS-PDSCH resource, and the scheduling information is received as triggered by a paging message.

Particularly for data of one group of UEs, upon reception of the data of the at least one group of UEs from the core network, the RNC determines the paging specific occasion location and the PI location according to the group identifier of the group, and transmits the paging specific occasion location, the PI location, and the MAC-ehs PDU including the indication information to indicate that the subsequent payload is data of a CTCH channel, to the NB to instruct the NB to transmit the MAC-ehs PDU, including the indication information to indicate that the subsequent payload is data of a CTCH channel, at the transmission location, determined from the paging specific occasion location and the PI location, over the PICH.

Correspondingly the NB transmits the MAC-ehs PDU, including the indication information to indicate that the subsequent payload is data of a CTCH channel, at the transmission location, determined from the paging specific occasion location and the PI location, over the PICH;

The UE determines the paging specific occasion location and the PI location according to the group identifier of the group to which the UE belongs and receives the MAC-ehs PDU at the paging specific occasion location and the PI location;

Then the RNC places in an FP frame and transmits the data of the group of UEs and the corresponding CFN number, and the CFN number corresponding to the scheduling information for scheduling the data of the group of UEs to the NB via the Iub interface to instruct the NB to map the CTCH onto the HS-PDSCH, to transmit the scheduling information according to the SFN corresponding to the CFN number of the scheduling information, and to transmit the data of the corresponding group of UEs according to the SFN corresponding to the CFN number of the data, where the CFN number corresponding to the scheduling information is determined from the timing relationship between the PICH and the scheduling information, and the CFN number corresponding to the data of the group of UEs is the CFN number corresponding to the CTCH occasion;

The NB maps the CTCH onto the HS-PDSCH, transmits the scheduling information according to the SFN corresponding to the CFN number of the scheduling information, and transmits the data of the corresponding group of UEs according to the SFN corresponding to the CFN number of the data; and Upon determining that the MAC-ehs PDU includes the indication information that the subsequent payload is data of a CTCH channel, the UE detects the HS-PDSCH channel for the scheduling information according to the broadcast timing relationship and fetches the data of the group, to which the UE belongs, in one scheduling periodicity according to the received scheduling information.

In a second transmission approach, the CTCH data is transmitted over a fixed HS-PDSCH resource, and the scheduling information is detected periodically.

Particularly for data of one group of UEs, upon reception of the data of the at least one group of UEs from the core network, the RNC places in an FP frame and transmits the data of the group of UEs and the corresponding CFN number, and the paging specific occasion location at which the group of UEs receive the scheduling information for scheduling the data of the group of UEs, to the NB to instruct the NB to map the CTCH onto the HS-PDSCH, to transmit the scheduling information at the paging specific occasion location, and to transmit the data of the corresponding group of UEs according to the SFN corresponding to the CFN number of the data;

Where the paging specific occasion location is the nearest one of respective paging specific occasion locations determined in Equation 4 to the current paging specific occasion location (where the paging specific occasion location is represented at the physical layer as an SFN); and the CFN number corresponding to the data of the group of UEs is the CFN number corresponding to the CTCH occasion (where the CTCH occasion refers to the first radio frame including the CBS data in the TTI of the FACH to which the CTCH is mapped, the CTCH occasion is determined in Equation 1, and the CTCH occasion is represented at the physical layer as an SFN).

Correspondingly the UE determines the group specific occasion in Equation 4 and receives the scheduling information on the group specific occasion;

The UE detects the HS-PDSCH configured on the CTCH occasion continuously for the length of time specified by the scheduling information and receives the data of the group, to which the UE belongs, over the HS-PDSCH; and The NB maps the CTCH onto the HS-PDSCH, transmits the scheduling information at the paging specific occasion location, and transmits the data of the corresponding group of UEs according to the SFN corresponding to the CFN number of the data.

In a third transmission approach, the CTCH data is transmitted over an HS-PDSCH resource scheduled by an HS-SCCH, and the scheduling information is received as triggered by a paging message.

Particularly for data of one group of UEs, upon reception of the data of the at least one group of UEs from the core network, the RNC determines the paging specific occasion location and the PI location according to the group identifier of the group, and transmits the paging specific occasion location, the PI location, and the MAC-ehs PDU including the indication information to indicate that the subsequent payload is data of a CTCH channel, to the NB to instruct the NB to transmit the MAC-ehs PDU, including the indication information to indicate that the subsequent payload is data of a CTCH channel, at the transmission location, determined from the paging specific occasion location and the PI location, over the PICH.

Correspondingly the NB transmits the MAC-ehs PDU, including the indication information to indicate that the subsequent payload is data of a CTCH channel, at the transmission location, determined from the paging specific occasion location and the PI location, over the PICH;

The UE determines the paging specific occasion location and the PI location according to the group identifier of the group to which the UE belongs and receives the MAC-ehs PDU at the paging specific occasion location and the PI location;

Then the RNC places in an FP frame and transmits the data of the group of UEs and the corresponding CFN number, and the CFN number corresponding to the scheduling information for scheduling the data of the group of UEs to the NB via the Iub interface to instruct the NB to map the CTCH onto the HS-PDSCH, to transmit the scheduling information according to the SFN corresponding to the CFN number of the scheduling information, and to transmit the data of the corresponding group of UEs according to the SFN corresponding to the CFN number of the data, where the CFN number corresponding to the scheduling information is determined from the timing relationship between the PICH and the scheduling information, and the CFN number corresponding to the data of the group of UEs is any CFN number in the length of time specified by the corresponding scheduling information;

The NB maps the CTCH onto the HS-PDSCH, transmits the scheduling information according to the SFN corresponding to the CFN number of the scheduling information, and transmits the data of the corresponding group of UEs according to the SFN corresponding to the CFN number of the data; and Upon determining that the MAC-ehs PDU includes the indication information that the subsequent payload is data of a CTCH channel, the UE receives control information of the HS-SCCH scrambled by the group specific H-RNTI according to the broadcast timing relationship, receives the scheduling information over the HS-PDSCH according to the control information of the HS-SCCH, and fetches the data of the group, to which the UE belongs, in one scheduling periodicity of the HS-PDSCH continuously according to the received scheduling information.

In a fourth transmission approach, the CTCH data is transmitted over an HS-PDSCH resource scheduled by an HS-SCCH, and the scheduling information is detected periodically.

Particularly for data of one group of UEs, upon reception of the data of the at least one group of UEs from the core network, the RNC places in an FP frame and transmits the data of the group of UEs and the corresponding CFN number, and the paging specific occasion location at which the group of UEs receive the scheduling information for scheduling the data of the group of UEs, to the NB to instruct the NB to map the CTCH onto the HS-PDSCH, to transmit the scheduling information at the paging specific occasion location, and to transmit the data of the corresponding group of UEs according to the SFN corresponding to the CFN number of the data;

Where the paging specific occasion location is the nearest one of respective paging specific occasion locations determined in Equation 4 to the current paging specific occasion location; and the CFN number corresponding to the data of the group of UEs is any CFN number in the length of time specified by the corresponding scheduling information.

Correspondingly the UE determines the group specific occasion in Equation 4 and receives the scheduling information over the HS-PDSCH by detecting the HS-SCCH scrambled by the group specific H-RNTI on the group specific occasion; and detects the HS-SCCH scrambled by the group specific H-RNTI continuously for the length of time specified by the scheduling information and receives the data of the group, to which the UE belongs, over the HS-PDSCH; and The NB transmits an HS-PDSCH channel resource corresponding to the data of the group of UEs, over an HS-SCCH scrambled by the group specific H-RNTI, and transmits the scheduling information over the HS-PDSCH, at the corresponding SFN according to the CFN information corresponding to the scheduling information in the FP frame; and transmits the resource information of the HS-PDSCH over the HS-SCCH scrambled by the group specific H-RNTI, and transmits the data of the group of UEs over the HS-PDSCH, at the corresponding SFN according to the CFN information corresponding to the data of the group of UEs in the FP frame.

Figure 4:
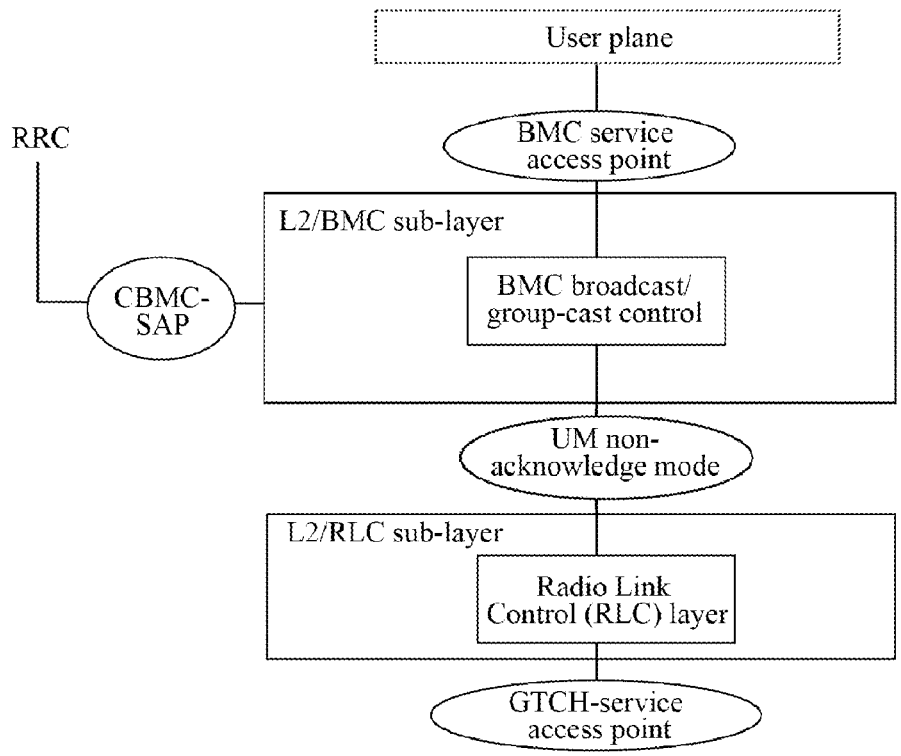
FIG. 4 illustrates a schematic diagram of a user plane in an LTE system according to an embodiment of the disclosure.

II. LTE System:

In the LTE system, a BMC entity or module is added to the user plane to perform buffering, scheduling and other functions as illustrated in FIG. 4. The BMC sub-layer receives and thereafter buffers group-cast data from a Mobility Management Entity (MME). The BMC sub-layer generates scheduling information for required transmission of the group-cast data.

Like the UMTS system, the group-cast data is categorized into scheduling information, and data of a group of UEs (i.e., CB data). The type of the group-cast data is visible at the BMC layer, and the data is packaged at the BMC layer. The scheduling information includes the occasion, the transmission length, the sub-frame configuration, and retransmission or not, of the next CBS scheduling periodicity. Both the two categories of data are transmitted over a GTCH channel.

The data is encapsulated at the MAC layer into a DL-SCH MAC PDU and scheduled by a prescribed specific Group-Radio Network Temporary Identity (G-RNTI).

Where in the LTE system, the radio access network includes an MME and an NB;

The MME transmits the received data of the at least one group of UEs from the core network to the NB; and The NB transmits the data of the at least one group of UEs and the corresponding scheduling information to the UE over the GTCH.

In an implementation, the NB receives a message forwarded by the MME from the core network to request for initiating group-cast, where the message includes the information to instruct the data to be transmitted over the shared resource, the information to identify the group, and the data of the at least one group of UEs.

Where the UE detects the group-cast data in two approaches:

In a first detection approach, the group-cast data is scheduled dynamically for transmission over a PDCCH.

Figure 5:
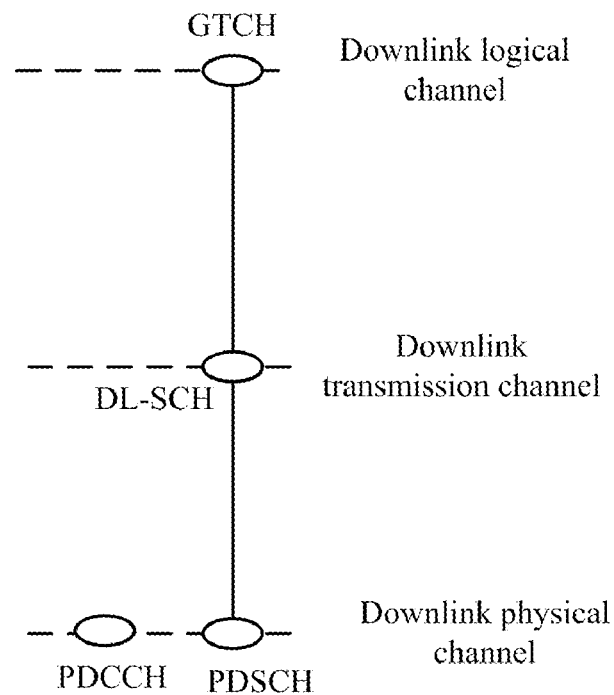
FIG. 5 illustrates a schematic diagram of the first mapping of a shared channel in an LTE system according to an embodiment of the disclosure.

In the embodiment of the disclosure, a new downlink logical channel GTCH is introduced, where the GTCH is carried over a DL-SCH and a PDCCH/PDSCH among transport channels and physical channels, as illustrated in FIG. 5. Resource configuration related to the GTCH is broadcasted in a system message.

The UE detects the occasion of the PDCCH control channel of the group-cast data in a DRX manner. The PDCCH control channel can be detected as follows:

$$SFN = m*N + (Group\_ID \bmod N) \quad \text{Equation 5;}$$

Where N represents the periodicity, of the PDCCH occasion, in a unit of radio frame, and m represents zero or a positive integer satisfying $M*N+(Group\_ID \bmod N) \leq Max\text{-}SFN$. The Group_ID represents the identifier corresponding to each group. In order to save power, the periodicity N can take a larger value. N is notified to the UE in an SIB. The radio frame number SFN is calculated in Equation 6 above. Furthermore the scheduling information can be detected in such sub-frames of the radio frame calculated in Equation 6 that are configured in the SIB. The UE detects the PDCCH using the G-RNTI in those sub-frames satisfying the SFN in the equation above and then receives the BMC layer scheduling information of the PDSCH channel according to the control information in the PDCCH and further receives the CB data according to the scheduling information. The scheduling information includes a message ID, the length of time for which the data is transmitted, and retransmission or not, the starting instance of time of the retransmitted message, and other contents. The UE receives the next group-cast data according to the contents in the scheduling information after parsing the scheduling information.

Particularly for data of one group of UEs, the NB maps the GTCH onto the PDSCH, transmits the PDSCH channel resource corresponding to the data of the group of UEs over a PDCCH scrambled by the G-RNTI, and transmits the scheduling information over the PDSCH, at the GTCH occasion corresponding to the group of UEs, and transmits resource information of the PDSCH over the PDCCH scrambled by the G-RNTI, and transmits the data of the group of UEs over the PDSCH corresponding to the resource information, on the GTCH occasion indicated by the scheduling information.

Correspondingly the UE detects the PDCCH scrambled by the G-RNTI in the specific sub-frames in the length of time indicated by the scheduling information and receives the data of the group, to which the UE belongs, over the PDSCH; or the UE detects the PDCCH scrambled by the G-RNTI continuously for the length of time indicated by the scheduling information and receives the data of the group, to which the UE belongs, over the PDSCH, where the UE determines the specific sub-frames in Equation 5.

In a second detection approach, the group-cast data is transmitted over a fixed resource.

Figure 6:
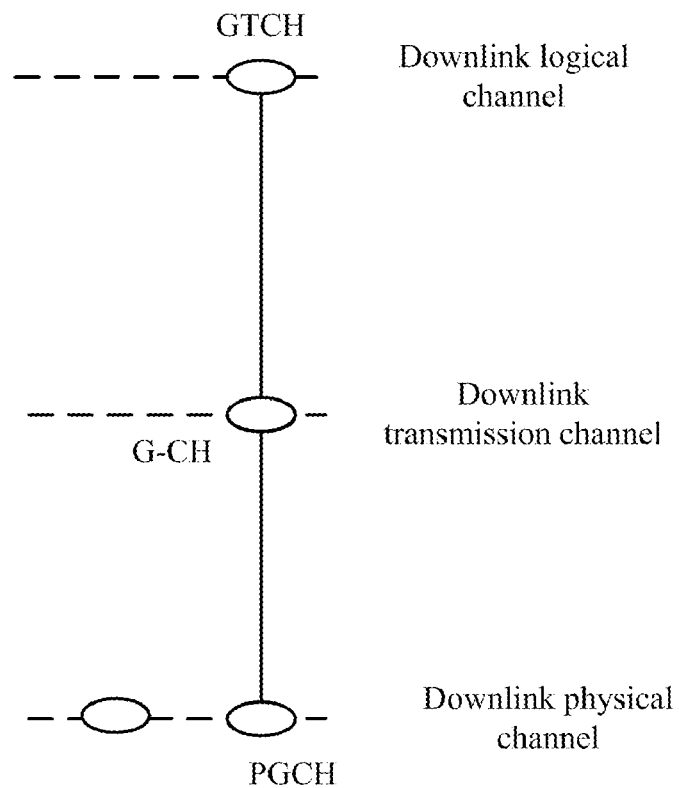
FIG. 6 illustrates a schematic diagram of the second mapping of a shared channel in an LTE system according to an embodiment of the disclosure.

New physical and transmission channels, which are a Physical Group Channel (PGCH) and a Group Chanel (GCH) respectively, need to be introduced for transmission over a fixed resource. FIG. 6 illustrates a corresponding channel mapping relationship.

The GCH reoccurs periodically at the following instances of time:

$$SFN \bmod N = \text{Offset} \quad \text{Equation 6;}$$

Where N represents a reoccurrence periodicity and Offset represents an offset. The offset can alternatively be calculated as Group_ID mod N.

Furthermore such a sub-frame in the radio frames calculated in Equation 6 above that is a PGCH resource to which the GCH is mapped can be further specified.

GTCH data includes scheduling information, and data of the group, both of which is transmitted by mapping the GCH to the PGCH.

The scheduling information includes a message ID, the length of time for which the data is transmitted, and retransmission or not, the starting instance of time of the retransmitted message, and other contents.

Particularly for data of one group of UEs, the NB maps the GTCH to the GCH, maps the GCH to the PGCH at an instance of time when the GCH is transmitted (determined in Equation 6), and transmits the data of the at least one group of UEs and the corresponding scheduling information to the UE over the PGCH.

Correspondingly the UE receives the data of the group, to which the UE belongs, over the PGCH in the length of time specified by the scheduling information upon reception of the scheduling information on the group specific GTCH occasion.

Where the scheduling information in the embodiment of the disclosure includes but will not be limited a part or all of the following information:

A CBS scheduling periodicity, a transmission length, sub-frame configuration, and retransmission or not.

The solution according to the disclosure will be described below respectively in several examples as listed.

A first example corresponds to the first transmission approach.

Figure 7:
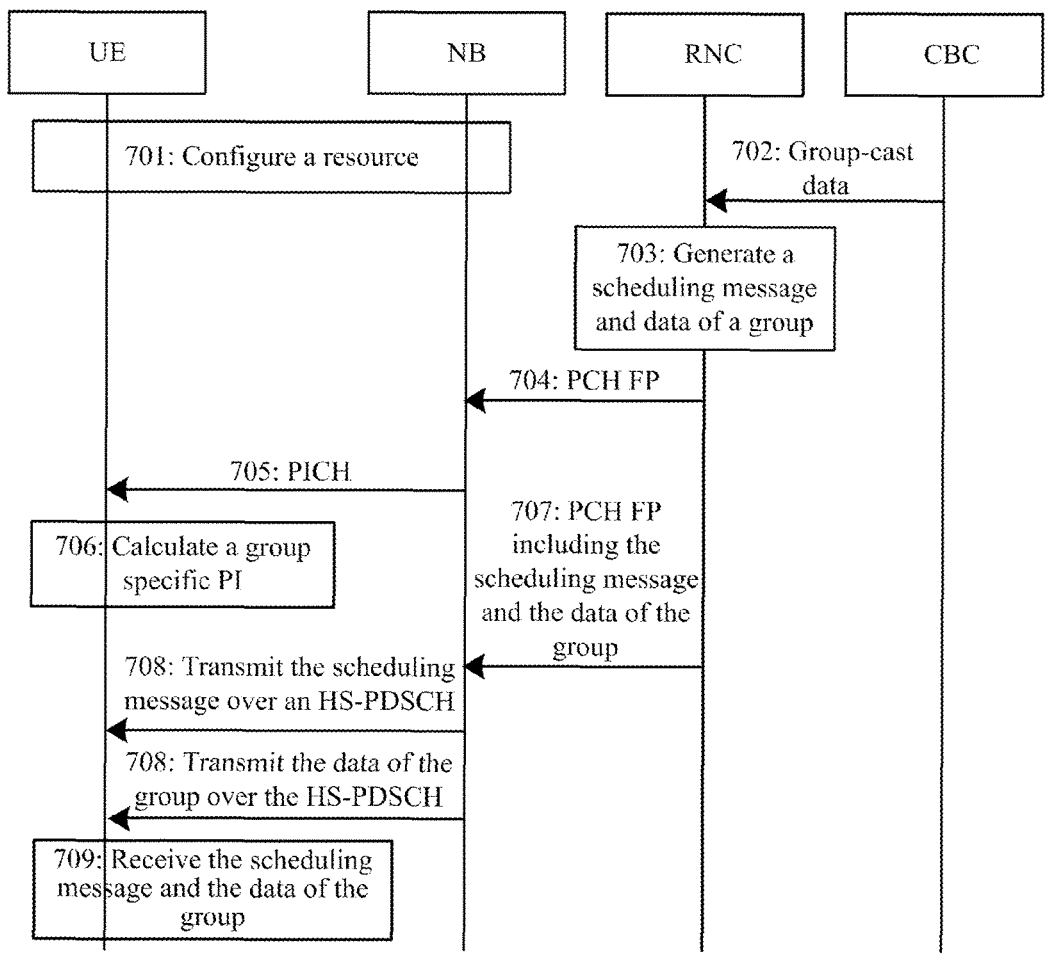
FIG. 7 illustrates a schematic flow chart of the first method for transmitting data in a UMTS system according to an embodiment of the disclosure.

As illustrated in FIG. 7, a first method for transmitting data in a UMTS system according to an embodiment of the disclosure includes:

In the operation 701, an RNC configures an NB with resource configuration information of a PICH channel, an HS-DSCH and/or an HS-PDSCH, and the NB broadcasts the resource configuration information as system information.

Where the resource configuration information includes a timeslot, a code channel, a TB block, transmit power and other information of the HS-PDSCH, a timing relationship between the received PICH, and the HS-PDSCH over which data of a group is transmitted, etc.

In the operation 702, a CBC initiates a request for group-cast data by carrying an indicator in a corresponding message (e.g., a write-replace message as illustrated) to notify the RNC that the data is transmitted over the HS-PDSCH resource.

Where the message further includes information to identify the group, e.g., a group ID, a message ID associated with the group ID, etc.

In the operation 703, the RNC generates scheduling information and group-cast data from the information in the data transmission indicator of the CBC upon reception of the data transmission indicator.

In the operation 704, the RNC calculates a paging specific occasion location and a PI location of the related group using the group ID, and places in a PCH FP frame and transmits the paging specific occasion location, the PI location, and an MAC-ehs PDU including indication information to indicate that a subsequent payload is data of a CTCH channel, to the Node B.

Where a PCH TBS section in the PCH FP frame is set to a null value.

In the operation 705, the NB determines the PICH at the paging specific occasion location and the PI location and transmits the MAC-ehs PDU, including the indication information to indicate that the subsequent payload is data of a CTCH channel, over the determined PICH.

In the operation 706, the UE calculates the paging specific occasion location and the PI location of the related group using the group ID, determines the PICH at the paging specific occasion location and the PI location and receives the MAC-ehs PDU over the determined PICH.

In the operation 707, the RNC calculates the location, at which the group of UEs receive the scheduling information, according to the timing relationship between the PICH and the scheduling information, transmits the scheduling information to the NB in a group HS-DSCH FP frame including the scheduling information with a CFN number which is a CFN number corresponding to the CTCH occasion calculated according to the timing relationship, and transmits the data of the group to the NB in the group HS-DSCH FP frame including the data of the group with a CFN number which is a CFN number of the CTCH occasion calculated in Equation 1.

Where the operation 707 may not necessarily be performed in a particular order relative to the operation 705 and the operation 706 as long as it is performed after the operation 704 and before the operation 708.

In the operation 708, the NB transmits the scheduling information according to the SFN corresponding to the CFN number of the scheduling information and transmits the data of the corresponding group of UEs according to the SFN corresponding to the CFN number of the data.

In the operation 709, upon determining that the MAC-ehs PDU includes the indication information that the subsequent payload is data of a CTCH channel, the UE detects the HS-PDSCH channel for the scheduling information according to the broadcast timing relationship and fetches the data of the group in one scheduling periodicity according to the received scheduling information.

A second example corresponds to the second transmission approach.

Figure 8:
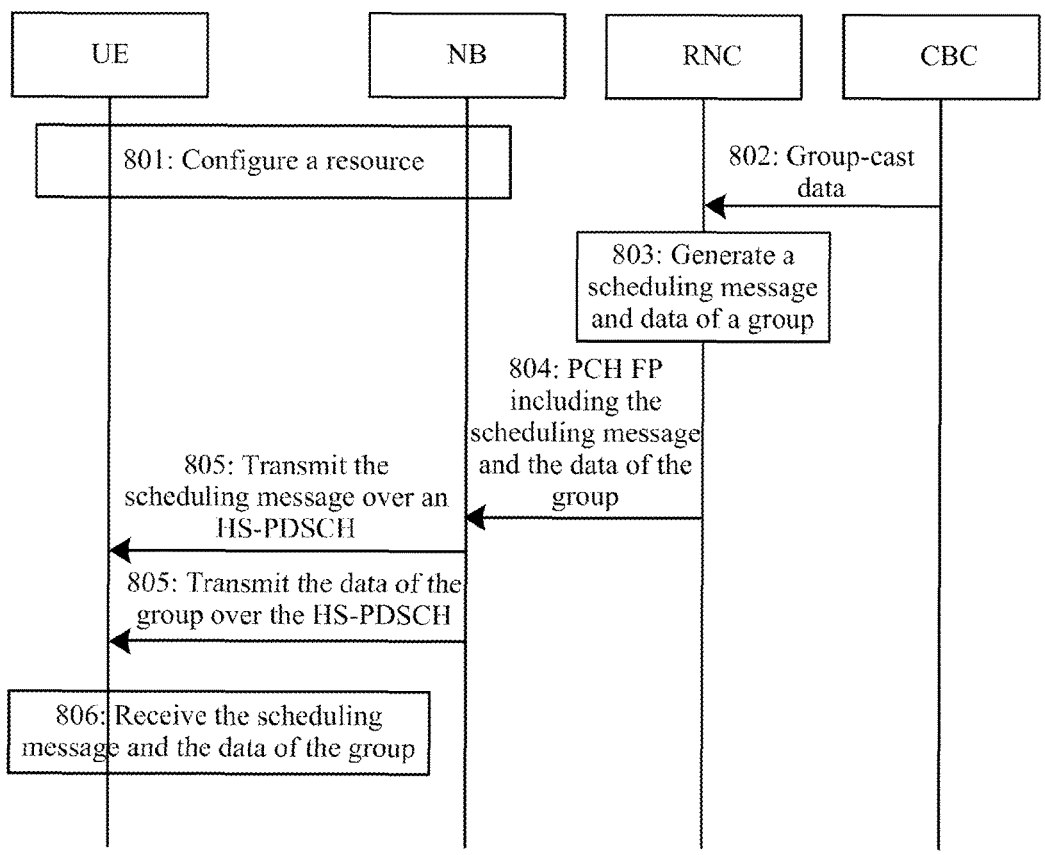
FIG. 8 illustrates a schematic flow chart of the second method for transmitting data in a UMTS system according to an embodiment of the disclosure.

As illustrated in FIG. 8, a second method for transmitting data in a UMTS system according to an embodiment of the disclosure includes:

In the operation 801, an RNC configures resources of an HS-PDSCH (a timeslot, a code channel and a Midamble code), TBS information of an HS-DSCH, transmit power of the HS-PDSCH and other information in an SIB message, and configures related parameters N, P, Offset and other information, from which a group specific occasion location, at which a group of UEs receive scheduling information, is calculated, in the SIB message;

Also the RNC configures an NB with the information above in a common transport reconfiguration message.

In the operation 802, a CBC initiates a request for group-cast data by carrying an indicator in a corresponding message (e.g., a write-replace message as illustrated) to notify the RNC that the data is transmitted over the HS-PDSCH resource. Also the message further includes information to identify the group, e.g., a group ID, a message ID associated with the group ID, etc.

In the operation 803, the RNC generates scheduling information and group-cast data from the information in the data transmission indicator of the CBC upon reception of the data transmission indicator.

In the operation 804, the RNC calculates the group specific occasion location, at which the group of UEs receive the scheduling information, in Equation 4, and thereafter the RNC transmits the scheduling information to the NB in a group HS-DSCH FP frame including the nearest group specific occasion (i.e., a CFN number corresponding to the scheduling information) and transmits the data of the group to the NB in the group HS-DSCH FP frame including the data of the group with a CFN number which is a CFN number corresponding to the CTCH occasion calculated in Equation 1.

In the operation 805, the NB transmits the scheduling information according to the SFN corresponding to the CFN number of the scheduling information and transmits the data of the corresponding group of UEs according to the SFN corresponding to the CFN number of the data.

In the operation 806, upon reception of the scheduling information on the group specific occasion calculated in Equation 4, the UE detects the HS-PDSCH resource configured on the CTCH occasion continuously for the length of time specified by the scheduling information and receives the data of the group over the HS-PDSCH resource.

A third example corresponds to the third transmission approach.

Figure 9:
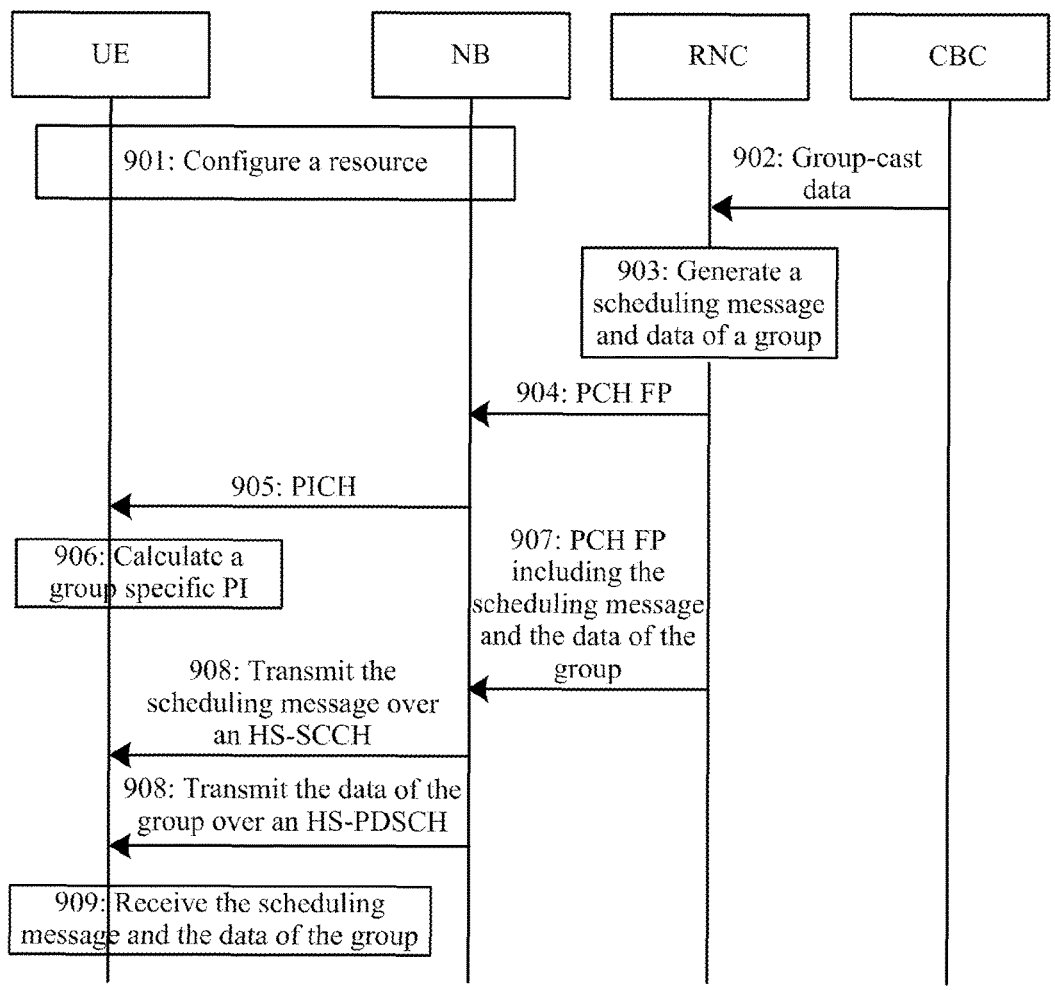
FIG. 9 illustrates a schematic flow chart of the third method for transmitting data in a UMTS system according to an embodiment of the disclosure.

As illustrated in FIG. 9, a third method for transmitting data in a UMTS system according to an embodiment of the disclosure includes:

In the operation 901, an RNC configures an NB with resource configuration information of a PICH channel, an HS-DSCH and/or an HS-PDSCH, and the NB broadcasts the resource configuration information as system information.

Where the resource configuration information includes a timeslot, a code channel, a TB block, transmit power and other information of the HS-PDSCH, a timing relationship between the received PICH, and the HS-PDSCH over which data of a group is transmitted, etc.

In the operation 902, a CBC initiates a request for group-cast data by carrying an indicator in a corresponding message (e.g., a write-replace message as illustrated) to notify the RNC that the data is transmitted over the HS-PDSCH resource.

Where the message further includes information to identify the group, e.g., a group ID, a message ID associated with the group ID, etc.

In the operation 903, the RNC generates scheduling information and group-cast data from the information in the data transmission indicator of the CBC upon reception of the data transmission indicator.

In the operation 904, the RNC calculates a paging specific occasion location and a PI location of the related group using the group ID, and places in a PCH FP frame and transmits the paging specific occasion location, the PI location, and an MAC-ehs PDU including indication information to indicate that a subsequent payload is data of a CTCH channel, to the Node B.

Where a PCH TBS section in the PCH FP frame is set to a null value.

In the operation 905, the NB determines the PICH at the paging specific occasion location and the PI location and transmits the MAC-ehs PDU, including the indication information to indicate that the subsequent payload is data of a CTCH channel, over the determined PICH.

In the operation 906, the UE calculates the paging specific occasion location and the PI location of the related group using the group ID, determines the PICH at the paging specific occasion location and the PI location and receives the MAC-ehs PDU over the determined PICH.

In the operation 907, the RNC calculates the location, at which the group of UEs receive the scheduling information, according to the timing relationship between the PICH and the scheduling information, transmits the scheduling information to the NB in a group HS-DSCH FP frame including the scheduling information with a CFN number which is a CFN number corresponding to the CTCH occasion calculated according to the timing relationship, and transmits the data of the group to the NB in the group HS-DSCH FP frame with a CFN number which is any CFN number in the length of time specified by the g scheduling information.

Where the operation 907 may not necessarily be performed in a particular order relative to the operation 905 and the operation 906 as long as it is performed after the operation 904 and before the operation 908.

In the operation 908, the NB transmits the scheduling information according to the SFN corresponding to the CFN number of the scheduling information and transmits the data of the corresponding group of UEs according to the SFN corresponding to the CFN number of the data.

In the operation 909, upon determining that the MAC-ehs PDU includes the indication information that the subsequent payload is data of a CTCH channel, the UE receives the HS-PDSCH channel scrambled by a group specific H-RNTI according to the broadcast timing relationship, receives the scheduling information over the HS-PDSCH channel according to control information of the HS-SCCH, and fetches the data of the group in one scheduling periodicity over the HS-PDSCH continuously according to the received scheduling information.

A fourth example corresponds to the fourth transmission approach.

Figure 10:
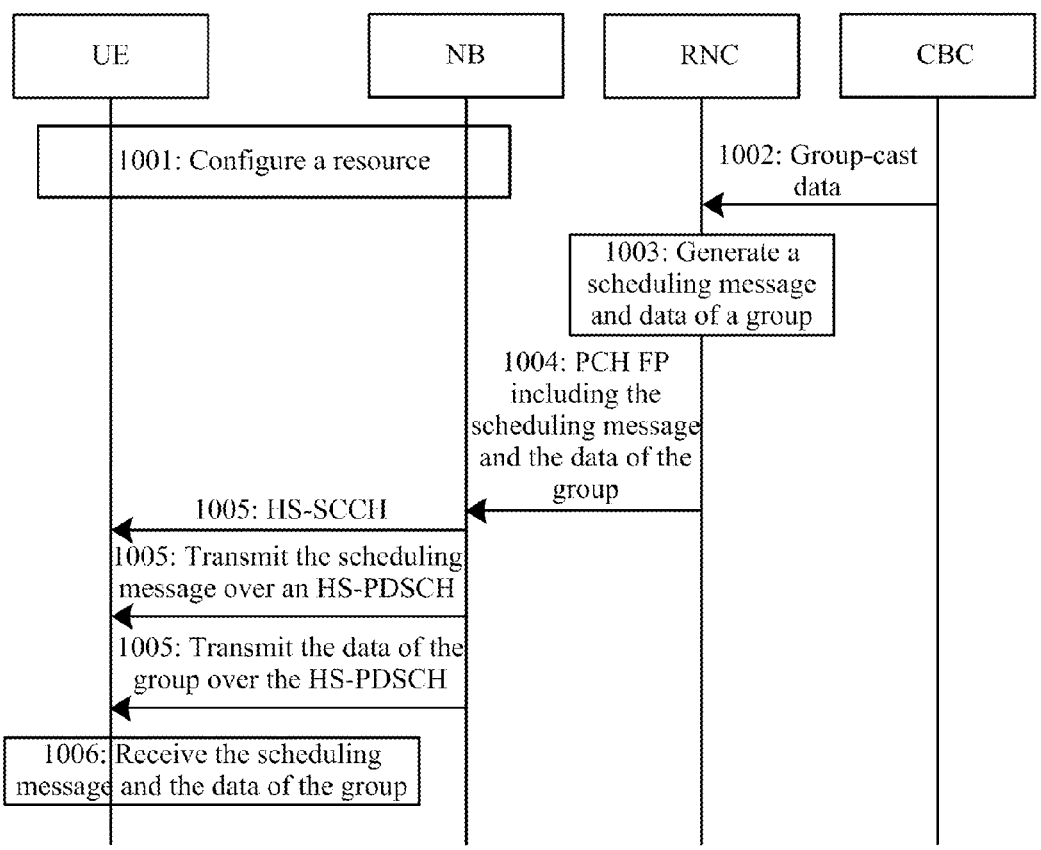
FIG. 10 illustrates a schematic flow chart of the fourth method for transmitting data in a UMTS system according to an embodiment of the disclosure.

As illustrated in FIG. 10, a fourth method for transmitting data in a UMTS system according to an embodiment of the disclosure includes:

In the operation 1001, an RNC configures resources of an HS-PDSCH (a timeslot, a code channel and a midamble code), TBS information of an HS-DSCH, transmit power of the HS-PDSCH and other information in an SIB message, and configures related parameters N, P, Offset and other information, from which a group specific occasion location, at which a group of UEs receive scheduling information, is calculated, in the SIB message;

Also the RNC configures an NB with the information above in a common transport reconfiguration message.

In the operation 1002, a CBC initiates a request for group-cast data by carrying an indicator in a corresponding message (e.g., a write-replace message as illustrated) to notify the RNC that the data is transmitted over the HS-PDSCH resource. Also the message further includes information to identify the group, e.g., a group ID, a message ID associated with the group ID, etc.

In the operation 1003, the RNC generates scheduling information and group-cast data from the information in the data transmission indicator of the CBC upon reception of the data transmission indicator.

In the operation 1004, the RNC calculates the group specific occasion location, at which the group of UEs receive the scheduling information, in Equation 4, and thereafter the RNC transmits the scheduling information to the NB in a group HS-DSCH FP frame including the nearest group specific occasion (i.e., a CFN number corresponding to the scheduling information) and transmits the data of the group to the NB in the group HS-DSCH FP frame including the data of the group with a CFN number which is any CFN number in the length of time specified by the scheduling information.

In the operation 1005, the NB transmits an HS-PDSCH channel resource corresponding to the data of the group of UEs, over an HS-SCCH scrambled by the group specific H-RNTI, and transmits the scheduling information over the HS-PDSCH, at the corresponding SFN according to the CFN information corresponding to the scheduling information in the FP frame; and transmits the resource information of the HS-PDSCH over the HS-SCCH scrambled by the group specific H-RNTI, and transmits the data of the group of UEs over the HS-PDSCH, at the corresponding SFN according to the CFN information corresponding to the data of the group of UEs in the FP frame.

In the operation 1006, the UE receives over the HS-SCCH the scheduling information over the HS-PDSCH by detecting the HS-SCCH scrambled by the group specific H-RNTI on the group specific occasion calculated in Equation 4; and detects the HS-SCCH scrambled by the group specific H-RNTI continuously for the length of time specified by the scheduling information and receives over the HS-SCCH the data of the group over the HS-PDSCH.

A fifth example corresponds to the first detection approach.

Figure 11:
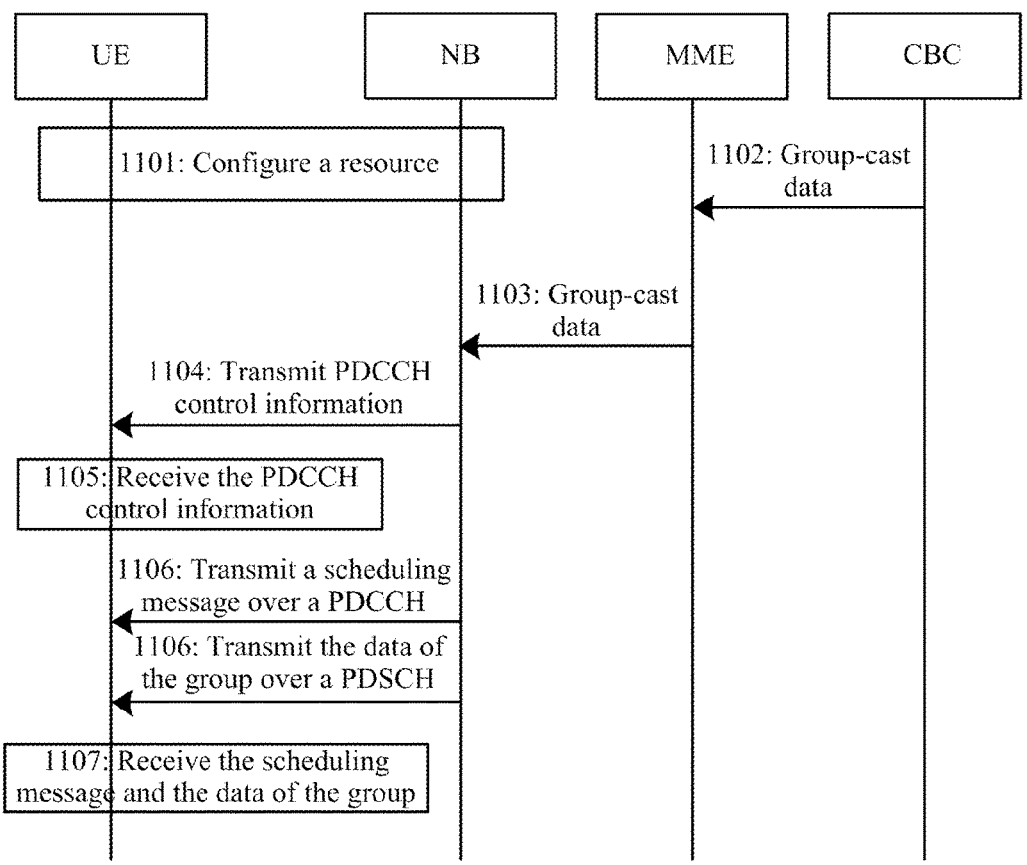
FIG. 11 illustrates a schematic flow chart of the first method for transmitting data in an LTE system according to an embodiment of the disclosure.

As illustrated in FIG. 11, a first method for transmitting data in an LTE system according to an embodiment of the disclosure includes:

In the operation 1101, an NB determines related parameters, from which a group of UEs calculate a GTCH occasion, e.g., a detection periodicity N, corresponding subframe configuration, etc., and broadcasts them in a system message.

In the operation 1102, a CBC initiates a request for group-cast data by carrying an indicator in a corresponding message (e.g., a write-replace message as illustrated) to notify an MME that the data is transmitted over a PDSCH resource. Also the message further includes information to identify a group, e.g., a group ID, a message ID associated with the group ID, etc.

In the operation 1103, the MME forwards the group-cast data to the NB and transports the parameters related to the data of the group, and the CB data of the group via an S1 interface to indicate to the NB that the data is transmitted over the PDSCH resource.

In the operation 1104, the NB transmits PDCCH control information on the GTCH occasion of the group (determined in Equation 6) according to the size, requirements on transmission (e.g., the number of retransmissions, a transmission periodicity, etc.), etc., of the group-cast data.

In the operation 1105, the UE detects a PDCCH channel for the PDCCH control information on the GTCH occasion of the group.

In the operation 1106, the NB transmits the scheduling information over the PDSCH and transmits the data of the group over the PDSCH.

In the operation 1107, the UE receives the scheduling information over the PDSCH resource scheduled by the PDCCH control information and then detects the PDCCH scrambled by a G-RNTI in a sub-frame configured in a radio frame calculated in Equation 1 or Equation 5 in the length of time indicated by the scheduling information or detects the PDCCH scrambled by the G-RNTI continuously for the length of time indicated by the scheduling information and receives over the PDCCH the group-cast data over the PDSCH resource.

Where the operation 1105 may not necessarily be performed before or after the operation 1106 as long as they are performed between the operation 1104 and the operation 1107.

A sixth example corresponds to the second detection approach.

Figure 12:
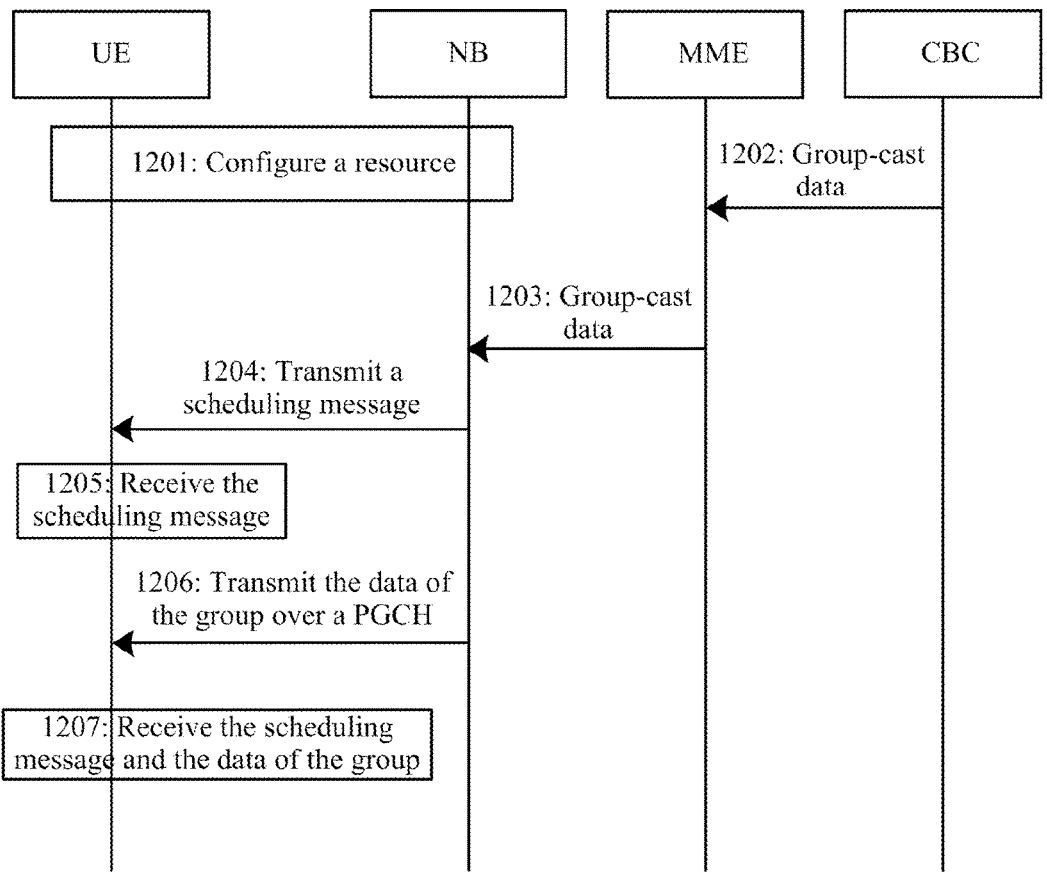
FIG. 12 illustrates a schematic flow chart of the second method for transmitting data in an LTE system according to an embodiment of the disclosure.

As illustrated in FIG. 12, a second method for transmitting data in an LTE system according to an embodiment of the disclosure includes:

In the operation 1201, an NB configures and broadcasts information about a PGCH resource over which group-cast data is transmitted, including a recurrence periodicity, an offset, a Modulation and Coding Scheme (MCS), the number of symbols occupied by a control channel in each sub-frame, etc.

In the operation 1202, a CBC initiates a request for group-cast data by carrying an indicator in a corresponding message (e.g., a write-replace message as illustrated) to notify an MME that the data is transmitted over a PDSCH resource. Also the message further includes information to identify a group, e.g., a group ID, a message ID associated with the group ID, etc.

In the operation 1203, the MME transmits the data of the group to the NB in write-replace signaling which also carries an indicator to instruct the NB to transmit the data of the group over the GCH.

In the operation 1204, upon reception of the data, the NB composes scheduling information from the size of the data and other information, calculates an instance of time, when the GCH is transmitted, in Equation 6, maps the GCH to the PGCH for transmission at the determined transmission instance of time and transmits the scheduling information on a group specific GTCH occasion over the PGCH.

In the operation 1205, the UE calculates the transmission instance of time in Equation 6 and receives the PGCH data, i.e., the scheduling information on the group specific GTCH occasion at the determined transmission instance of time.

In the operation 1206, the NB transmits the data of the group over the PGCH at the instance of time corresponding to the scheduling information.

In the operation 1207, the UE receives the data of the group transmitted over the PGCH in the specified length of time according to the indicator upon reception of the scheduling information.

Figure 13A:
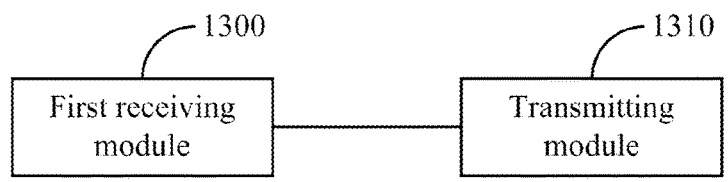
FIG. 13A illustrates a schematic functionally-structural diagram of a radio access network device in a system for transmitting data according to an embodiment of the disclosure.

As illustrated in FIG. 13A, a radio access network device in a system for transmitting data according to an embodiment of the disclosure includes a first receiving module 1300 and a transmitting module 1310.

The first receiving module 1300 is configured to receive data of at least one group of UEs from a core network; and The transmitting module 1310 is configured to transmit data of a group to UEs in the corresponding group over a user plane shared resource.

Preferably in a UMTS system, the radio access network device is an RNC;

The first receiving module 1300 is configured to receive the data of the at least one group of UEs from the core network via an IuBC interface; and The transmitting module 1310 is configured to transmit the data of the at least one group of UEs and corresponding scheduling information to an NB via an Iub interface to instruct the NB to transmit the scheduling information, and the data of the at least one group of UEs to the UEs over a CTCH.

Preferably the first receiving module 1300 receives a message from the core network to request for initiating group-cast, where the message includes information to instruct the data to be transmitted over the shared resource, information to identify the group, and the data of the at least one group of UEs.

Preferably before the data of the group is transmitted to the UEs in the corresponding group over the user plane shared resource, for data of one group of UEs, the transmitting module 1310 determines a paging specific occasion location and a PI location according to the group identifier of the group, and transmits the paging specific occasion location, the PI location, and an MAC-ehs PDU including indication information to indicate that a subsequent payload is data of a CTCH channel, to the NB to instruct the NB to transmit the MAC-ehs PDU, including the indication information to indicate that the subsequent payload is data of a CTCH channel, at a transmission location, determined from the paging specific occasion location and the PI location, over a PICH.

Preferably for data of one group of UEs, the transmitting module 1310 places in an FP frame and transmits the data of the group of UEs and a corresponding CFN number, and a CFN number corresponding to the scheduling information for scheduling the data of the group of UEs to the NB via the Iub interface to instruct the NB to map the CTCH onto an HS-PDSCH, to transmit the scheduling information according to an SFN corresponding to the CFN number of the scheduling information, and to transmit the data of the corresponding group of UEs according to an SFN corresponding to the CFN number of the data, Where the CFN number corresponding to the scheduling information is determined from a timing relationship between the PICH and the scheduling information, and the CFN number corresponding to the data of the group of UEs is a CFN number corresponding to a CTCH occasion or any CFN number in a length of time specified by the corresponding scheduling information.

Preferably before the data of the group is transmitted to the UEs in the corresponding group over the user plane shared resource, for data of one group of UEs, the transmitting module 1310 places in an FP frame and transmits the data of the group of UEs and a corresponding CFN number, and a paging specific occasion location at which the group of UEs receive the scheduling information for scheduling the data of the group of UEs, to the NB to instruct the NB to map the CTCH onto an HS-PDSCH, to transmit the scheduling information at the paging specific occasion location, and to transmit the data of the corresponding group of UEs according to an SFN corresponding to the CFN number of the data;

Where the paging specific occasion location is the nearest one of respective paging specific occasion locations determined in the equation of SFN=K+(m*P+(Group_ID mod P))*N to the current paging specific occasion location, where N represents a periodicity at which a CTCH reoccurs, K represents an offset of a CBS frame, m represents zero or a positive integer satisfying K+(M*P+(Group_ID mod P))*N≤MaxSFN, M represents a TTI at which the CTCH is mapped to an HS-DSCH, P represents a periodicity at which the scheduling information occurs, and the Group_ID represents the identifier of the group; and The CFN number corresponding to the data of the group of UEs is a CFN number corresponding to a CTCH occasion or any CFN number in a length of time specified by the corresponding scheduling information.

Preferably in an LTE system, the radio access network device is an NB;

The first receiving module 1300 receives and transmits to the NB the data of the at least one group of UEs, from the core network, transmitted by an MME; and The transmitting module 1310 transmits the data of the at least one group of UEs and corresponding scheduling information to the UEs over a GTCH.

Preferably the first receiving module 1300 receives a message forwarded by the MME from the core network to request for initiating group-cast, where the message includes information to instruct the data to be transmitted over the shared resource, information to identify the group, and the data of the at least one group of UEs, Preferably for data of one group of UEs, the transmitting module 1310 maps the GTCH onto a PDSCH, transmits a PDSCH channel resource corresponding to the data of the group of UEs over a PDCCH scrambled by a G-RNTI, and transmits the scheduling information over the PDSCH, at a GTCH occasion corresponding to the group of UEs, and transmits resource information of the PDSCH over the PDCCH scrambled by the G-RNTI, and transmits the data of the group of UEs over the PDSCH corresponding to the resource information, on a GTCH occasion indicated by the scheduling information.

Preferably for data of one group of UEs, the transmitting module 1310 maps the GTCH to a GCH, maps the GCH to a PGCH at an instance of time when the GCH is transmitted, and transmits the data of the at least one group of UEs and the corresponding scheduling information to the UEs over the PGCH.

Figure 13B:
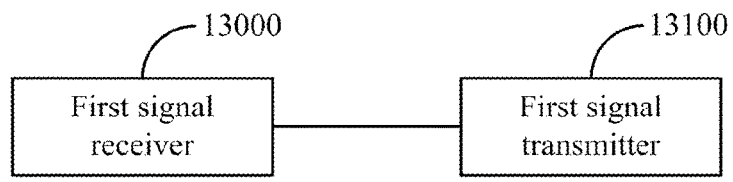
FIG. 13B illustrates a schematic physically-structural diagram of a radio access network device in a system for transmitting data according to an embodiment of the disclosure.

Particularly in hardware, the first receiving module 1300 can be a signal receiver including a receive antenna, etc., and the transmitting module 1310 can be a signal transmitter including a transmit antenna, etc, and at this time, as illustrated in FIG. 13. B, a radio access network device in a system for transmitting data according to an embodiment of the disclosure includes:

A first signal receiver 13000 is configured to receive data of at least one group of UEs from a core network; and A first signal transmitter 13100 is configured to transmit data of a group to UEs in the corresponding group over a user plane shared resource.

Preferably in a UMTS system, the radio access network device is an RNC;

The first signal receiver 13000 is configured to receive the data of the at least one group of UEs from the core network via an IuBC interface; and The first signal transmitter 13100 is configured to transmit the data of the at least one group of UEs and corresponding scheduling information to an NB via an Iub interface to instruct the NB to transmit the scheduling information, and the data of the at least one group of UEs to the UEs over a CTCH.

Preferably the first signal receiver 13000 receives a message from the core network to request for initiating group-cast, where the message includes information to instruct the data to be transmitted over the shared resource, information to identify the group, and the data of the at least one group of UEs.

Preferably before the data of the group is transmitted to the UEs in the corresponding group over the user plane shared resource, for data of one group of UEs, the first signal transmitter 13100 determines a paging specific occasion location and a PI location according to the group identifier of the group, and transmits the paging specific occasion location, the PI location, and an MAC-ehs PDU including indication information to indicate that a subsequent payload is data of a CTCH channel, to the NB to instruct the NB to transmit the MAC-ehs PDU, including the indication information to indicate that the subsequent payload is data of a CTCH channel, at a transmission location, determined from the paging specific occasion location and the PI location, over a PICH.

Preferably for data of one group of UEs, the first signal transmitter 13100 places in an FP frame and transmits the data of the group of UEs and a corresponding CFN number, and a CFN number corresponding to the scheduling information for scheduling the data of the group of UEs to the NB via the Iub interface to instruct the NB to map the CTCH onto an HS-PDSCH, to transmit the scheduling information according to an SFN corresponding to the CFN number of the scheduling information, and to transmit the data of the corresponding group of UEs according to an SFN corresponding to the CFN number of the data, Where the CFN number corresponding to the scheduling information is determined from a timing relationship between the PICH and the scheduling information, and the CFN number corresponding to the data of the group of UEs is a CFN number corresponding to a CTCH occasion or any CFN number in a length of time specified by the corresponding scheduling information.

Preferably before the data of the group is transmitted to the UEs in the corresponding group over the user plane shared resource, for data of one group of UEs, the first signal transmitter 13100 places in an FP frame and transmits the data of the group of UEs and a corresponding CFN number, and a paging specific occasion location at which the group of UEs receive the scheduling information for scheduling the data of the group of UEs, to the NB to instruct the NB to map the CTCH onto an HS-PDSCH, to transmit the scheduling information at the paging specific occasion location, and to transmit the data of the corresponding group of UEs according to an SFN corresponding to the CFN number of the data;

Where the paging specific occasion location is the nearest one of respective paging specific occasion locations determined in the equation of SFN=K+(m*P+(Group_ID mod P))*N to the current paging specific occasion location, where N represents a periodicity at which a CTCH reoccurs, K represents an offset of a CBS frame, m represents zero or a positive integer satisfying K+(M*P+(Group_ID mod P))*N≤MaxSFN, M represents a TTI at which the CTCH is mapped to an HS-DSCH, P represents a periodicity at which the scheduling information occurs, and the Group_ID represents the identifier of the group; and The CFN number corresponding to the data of the group of UEs is a CFN number corresponding to a CTCH occasion or any CFN number in a length of time specified by the corresponding scheduling information.

Preferably in an LTE system, the radio access network device is an NB;

The first signal receiver 13000 receives and transmits to the NB the data of the at least one group of UEs, from the core network, transmitted by an MME; and The first signal transmitter 13100 transmits the data of the at least one group of UEs and corresponding scheduling information to the UEs over a GTCH.

Preferably the first signal receiver 13000 receives a message forwarded by the MME from the core network to request for initiating group-cast, where the message includes information to instruct the data to be transmitted over the shared resource, information to identify the group, and the data of the at least one group of UEs, Preferably for data of one group of UEs, the first signal transmitter 13100 maps the GTCH onto a PDSCH, transmits a PDSCH channel resource corresponding to the data of the group of UEs over a PDCCH scrambled by a G-RNTI, and transmits the scheduling information over the PDSCH, at a GTCH occasion corresponding to the group of UEs, and transmits resource information of the PDSCH over the PDCCH scrambled by the G-RNTI, and transmits the data of the group of UEs over the PDSCH corresponding to the resource information, on a GTCH occasion indicated by the scheduling information.

Preferably for data of one group of UEs, the first signal transmitter 13100 maps the GTCH to a GCH, maps the GCH to a PGCH at an instance of time when the GCH is transmitted, and transmits the data of the at least one group of UEs and the corresponding scheduling information to the UEs over the PGCH.

Figure 14A:
FIG. 14A illustrates a schematic functionally-structural diagram of a UE in a system for transmitting data according to an embodiment of the disclosure.

As illustrated in FIG. 14, a UE in a system for transmitting data according to an embodiment of the disclosure includes a determining module 1400 and a second receiving module 1410.

The determining module 1400 is configured to determine a group to which the UE belongs; and The second receiving module 1410 is configured to receive data of the group, to which the UE belongs, from the network side over a user plane shared resource.

Preferably in a UMTS system, the second receiving module 1410 determines a paging specific occasion location and a PI location according to the group identifier of the group to which the UE belongs, receives an MAC-ehs PDU at the paging specific occasion location and the PI location; and receives the data of the group, to which the UE belongs, from the network side over the user plane shared resource upon determining that the MAC-ehs PDU includes indication information that a subsequent payload is data of a CTCH channel.

Preferably the second receiving module 1410 receives the MAC-ehs PDU by a group specific PI at the paging specific occasion location and the PI location; or receives pre-configured HS-DSCH data including the MAC-ehs PDU on a group specific occasion at the paging specific occasion location and the PI location; or receives an HS-PDSCH including the MAC-ehs PDU, over an HS-SCCH scrambled by a group specific H-RNTI, by the group specific PI or on the group specific occasion at the paging specific occasion location and the PI location.

Preferably the second receiving module 1410 detects the HS-PDSCH channel for scheduling information according to a broadcast timing relationship and fetches the data of the group, to which the UE belongs, in one scheduling periodicity according to the received scheduling information.

Preferably the second receiving module 1410 receives control information of an HS-SCCH scrambled by a group specific H-RNTI according to a broadcast timing relationship, receives scheduling information over an HS-PDSCH according to the control information of the HS-SCCH, and fetches the data of the group, to which the UE belongs, in one scheduling periodicity of the HS-PDSCH continuously according to the received scheduling information.

Preferably in a UMTS system, the second receiving module 1410 receives scheduling information on a group specific occasion, detects an HS-PDSCH configured on a CTCH occasion continuously for a length of time specified by the scheduling information, and receives the data of the group, to which the UE belongs, over the HS-PDSCH.

Preferably in a UMTS system, the second receiving module 1410 receives scheduling information over an HS-PDSCH by detecting an HS-SCCH scrambled by a group specific H-RNTI on a group specific occasion, detects an HS-SCCH scrambled by the group specific H-RNTI continuously for a length of time specified by the scheduling information, and receives the data of the group, to which the UE belongs, over the HS-SCCH.

Preferably the second receiving module 1410 determines the paging specific occasion in the equation of:

SFN=K+(m*P+(Group_ID mod P))*N, where N represents a periodicity at which a CTCH reoccurs, K represents an offset of a CBS frame, m represents zero or a positive integer satisfying K+(M*P+(Group_ID mod P))*N≤MaxSFN, M represents a TTI at which the CTCH is mapped to an HS-DSCH, P represents a periodicity at which the scheduling information occurs, and the Group_ID represents the identifier of the group.

Preferably in an LTE system, the second receiving module 1410 receives scheduling information over a PDSCH resource scheduled by a PDCCH channel, detects a PDCCH scrambled by a G-RNTI in a specific sub-frame in a length of time specified by the scheduling information, and receives the data of the group, to which the UE belongs, over the PDSCH; or the UE detects the PDCCH scrambled by the G-RNTI continuously for the length of time specified by the scheduling information and receives the data of the group, to which the UE belongs, over the PDSCH.

Where the UE determines the specific sub-frame in the equation of:

SFN=(K+m*N) or SFN=m*N+(Group_ID mod N),

Where K represents an offset of a CBS frame, N represents a periodicity, of a PDCCH occasion, in a unit of radio frame, m represents zero or a positive integer satisfying M*N+(Group_ID mod N)≤MaxSFN, and the Group_ID represents the identifier of the group.

Preferably in an LTE system, the second receiving module 1410 receives the data of the group, to which the UE belongs, over a PGCH in a length of time specified by scheduling information upon reception of the scheduling information on a group specific GTCH occasion.

Figure 14B:
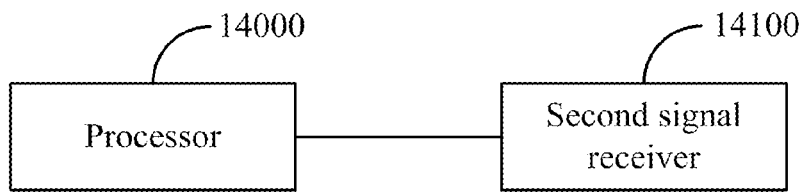
FIG. 14B illustrates a schematic physically-structural diagram of a UE in a system for transmitting data according to an embodiment of the disclosure.

Particularly in hardware, the determining module 1400 can be a processor, and the second receiving module 1410 can be a signal receiver including a receive antenna, etc., and at this time, as illustrated in FIG. 14B, a UE in a system for transmitting data according to an embodiment of the disclosure includes:

A processor 14000 is configured to determine a group to which the UE belongs; and The second signal receiver 14100 is configured to receive data of the group, to which the UE belongs, from the network side over a user plane shared resource.

Preferably in a UMTS system, the second signal receiver 14100 determines a paging specific occasion location and a PI location according to the group identifier of the group to which the UE belongs, receives an MAC-ehs PDU at the paging specific occasion location and the PI location; and receives the data of the group, to which the UE belongs, from the network side over the user plane shared resource upon determining that the MAC-ehs PDU includes indication information that a subsequent payload is data of a CTCH channel.

Preferably the second signal receiver 14100 receives the MAC-ehs PDU by a group specific PI at the paging specific occasion location and the PI location; or receives preconfigured HS-DSCH data including the MAC-ehs PDU on a group specific occasion at the paging specific occasion location and the PI location; or receives an HS-PDSCH including the MAC-ehs PDU, over an HS-SCCH scrambled by a group specific H-RNTI, by the group specific PI or on the group specific occasion at the paging specific occasion location and the PI location.

Preferably the second signal receiver 14100 detects the HS-PDSCH channel for scheduling information according to a broadcast timing relationship and fetches the data of the group, to which the UE belongs, in one scheduling periodicity according to the received scheduling information.

Preferably the second signal receiver 14100 receives control information of an HS-SCCH scrambled by a group specific H-RNTI according to a broadcast timing relationship, receives scheduling information over an HS-PDSCH according to the control information of the HS-SCCH, and fetches the data of the group, to which the UE belongs, in one scheduling periodicity of the HS-PDSCH continuously according to the received scheduling information.

Preferably in a UMTS system, the second signal receiver 14100 receives scheduling information on a group specific occasion, detects an HS-PDSCH configured on a CTCH occasion continuously for a length of time specified by the scheduling information, and receives the data of the group, to which the UE belongs, over the HS-PDSCH.

Preferably in a UMTS system, the second signal receiver 14100 receives scheduling information over an HS-PDSCH by detecting an HS-SCCH scrambled by a group specific H-RNTI on a group specific occasion, detects an HS-SCCH scrambled by the group specific H-RNTI continuously for a length of time specified by the scheduling information, and receives the data of the group, to which the UE belongs, over the HS-SCCH.

Preferably the second signal receiver 14100 determines the paging specific occasion in the equation of:

$SFN = K + (m*P + (Group\_ID \bmod P))*N$, where N represents a periodicity at which a CTCH reoccurs, K represents an offset of a CBS frame, m represents zero or a positive integer satisfying $K + (M*P + (Group\_ID \bmod P))*N \leq MaxSFN$, M represents a TTI at which the CTCH is mapped to an HS-DSCH, P represents a periodicity at which the scheduling information occurs, and the Group_ID represents the identifier of the group.

Preferably in an LTE system, the second signal receiver 14100 receives scheduling information over a PDSCH resource scheduled by a PDCCH channel, detects a PDCCH scrambled by a G-RNTI in a specific sub-frame in a length of time specified by the scheduling information, and receives the data of the group, to which the UE belongs, over the PDSCH; or the UE detects the PDCCH scrambled by the G-RNTI continuously for the length of time specified by the scheduling information and receives the data of the group, to which the UE belongs, over the PDSCH.

Where the UE determines the specific sub-frame in the equation of:

$SFN = (K + m*N)$ or $SFN = m*N + (Group\_ID \bmod N)$,

Where K represents an offset of a CBS frame, N represents a periodicity, of a PDCCH occasion, in a unit of radio frame, m represents zero or a positive integer satisfying $M*N + (Group\_ID \bmod N) \leq MaxSFN$, and the Group_ID represents the identifier of the group.

Preferably in an LTE system, the second signal receiver 14100 receives the data of the group, to which the UE belongs, over a PGCH in a length of time specified by scheduling information upon reception of the scheduling information on a group specific GTCH occasion.

Based upon the same inventive idea, an embodiment of the disclosure further provides a method for transmitting data by a radio access network, and since the method corresponds to the radio access network device in a system for transmitting data, and the method addresses the problem under a similar principle to the radio access network device in a system for transmitting data, reference can be made to the implementation of the device for an implementation of the method, and a repeated description thereof will be omitted here.

Figure 15:
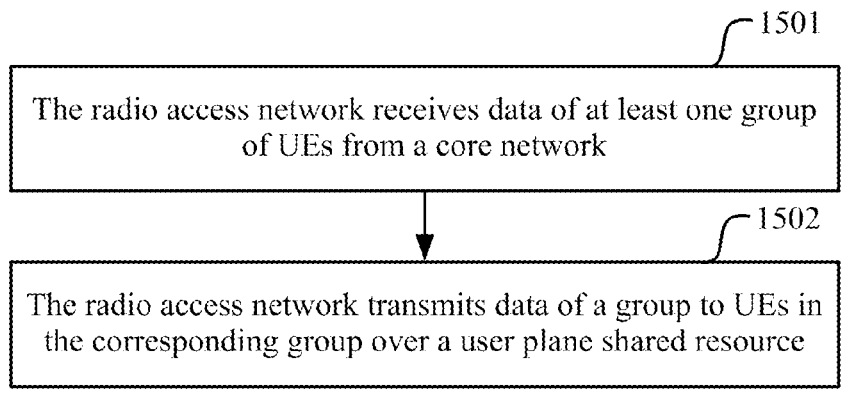
FIG. 15 illustrates a schematic flow chart of a method for transmitting data by a radio access network according to an embodiment of the disclosure.

As illustrated in FIG. 15, a method for transmitting data by a radio access network according to an embodiment of the disclosure includes the following operations:

In the operation 1501, the radio access network receives data of at least one group of UEs from a core network; and In the operation 1502, the radio access network transmits data of a group to UEs in the corresponding group over a user plane shared resource.

Different transmission approaches applicable to different systems will be described below respectively.

I. In a UMTS system, a radio access network device includes an RNC and an NB.

The RNC receives the data of the at least one group of UEs from the core network via an Iu Broadcast Control (IuBC) interface; and The RNC transmits the data of the at least one group of UEs and corresponding scheduling information to the NB via an Iub interface to instruct the NB to transmit the scheduling information, and the data of the at least one group of UEs to the UEs over a CTCH.

Particularly the RNC receives a message from the core network to request for initiating group-cast, where the message includes information to instruct the data to be transmitted over the shared resource, information to identify the group, and the data of the at least one group of UEs.

In a first transmission approach, the CTCH data is transmitted over a fixed HS-PDSCH resource, and the scheduling information is received as triggered by a paging message.

Particularly for data of one group of UEs, upon reception of the data of the at least one group of UEs from the core network, the RNC determines a paging specific occasion location and a PI location according to the group identifier of the group, and transmits the paging specific occasion location, the PI location, and an MAC-ehs PDU including indication information to indicate that a subsequent payload is data of a CTCH channel, to the NB to instruct the NB to transmit the MAC-ehs PDU, including the indication information to indicate that the subsequent payload is data of a CTCH channel, at a transmission location, determined from the paging specific occasion location and the PI location, over a PICH.

The RNC places in an FP frame and transmits the data of the group of UEs and a corresponding CFN number, and a CFN number corresponding to the scheduling information for scheduling the data of the group of UEs to the NB via the Iub interface to instruct the NB to map the CTCH onto an HS-PDSCH, to transmit the scheduling information according to an SFN corresponding to the CFN number of the scheduling information, and to transmit the data of the corresponding group of UEs according to an SFN corresponding to the CFN number of the data, where the CFN number corresponding to the scheduling information is determined from a timing relationship between the PICH and the scheduling information, and the CFN number corresponding to the data of the group of UEs is a CFN number corresponding to a CTCH occasion; and The NB maps the CTCH onto the HS-PDSCH, transmits the scheduling information according to the SFN corresponding to the CFN number of the scheduling information, and transmits the data of the corresponding group of UEs according to the SFN corresponding to the CFN number of the data.

In a second transmission approach, the CTCH data is transmitted over a fixed HS-PDSCH resource, and the scheduling information is detected periodically.

Particularly for data of one group of UEs, upon reception of the data of the at least one group of UEs from the core network, the RNC places in an FP frame and transmits the data of the group of UEs and a corresponding CFN number, and a paging specific occasion location at which the group of UEs receive the scheduling information for scheduling the data of the group of UEs, to the NB to instruct the NB to map the CTCH onto an HS-PDSCH, to transmit the scheduling information at the paging specific occasion location, and to transmit the data of the corresponding group of UEs according to an SFN corresponding to the CFN number of the data;

Where the paging specific occasion location is the nearest one of respective paging specific occasion locations determined in Equation 4 to the current paging specific occasion location (where the paging specific occasion location is represented at the physical layer as an SFN); and the CFN number corresponding to the data of the group of UEs is a CFN number corresponding to a CTCH occasion (where the CTCH occasion refers to a first radio frame including CBS data in a TTI of an FACH to which the CTCH is mapped, the CTCH occasion is determined in Equation 1, and the CTCH occasion is represented at the physical layer as an SFN); and The NB maps the CTCH onto the HS-PDSCH, transmits the scheduling information at the paging specific occasion location, and transmits the data of the corresponding group of UEs according to the SFN corresponding to the CFN number of the data.

In a third transmission approach, the CTCH data is transmitted over an HS-PDSCH resource scheduled by an HS-SCCH, and the scheduling information is received as triggered by a paging message.

Particularly for data of one group of UEs, upon reception of the data of the at least one group of UEs from the core network, the RNC determines a paging specific occasion location and a PI location according to the group identifier of the group, and transmits the paging specific occasion location, the PI location, and an MAC-ehs PDU including indication information to indicate that a subsequent payload is data of a CTCH channel, to the NB to instruct the NB to transmit the MAC-ehs PDU, including the indication information to indicate that the subsequent payload is data of a CTCH channel, at a transmission location, determined from the paging specific occasion location and the PI location, over a PICH.

The RNC places in an FP frame and transmits the data of the group of UEs and a corresponding CFN number, and a CFN number corresponding to the scheduling information for scheduling the data of the group of UEs to the NB via the Iub interface to instruct the NB to map the CTCH onto an HS-PDSCH, to transmit the scheduling information according to an SFN corresponding to the CFN number of the scheduling information, and to transmit the data of the corresponding group of UEs according to an SFN corresponding to the CFN number of the data, where the CFN number corresponding to the scheduling information is determined from a timing relationship between the PICH and the scheduling information, and the CFN number corresponding to the data of the group of UEs is any CFN number in a length of time specified by the corresponding scheduling information; and The NB maps the CTCH onto the HS-PDSCH, transmits the scheduling information according to the SFN corresponding to the CFN number of the scheduling information, and transmits the data of the corresponding group of UEs according to the SFN corresponding to the CFN number of the data.

In a fourth transmission approach, the CTCH data is transmitted over an HS-PDSCH resource scheduled by an HS-SCCH, and the scheduling information is detected periodically.

Particularly for data of one group of UEs, upon reception of the data of the at least one group of UEs from the core network, the RNC places in an FP frame and transmits the data of the group of UEs and a corresponding CFN number, and a paging specific occasion location at which the group of UEs receive the scheduling information for scheduling the data of the group of UEs, to the NB to instruct the NB to map the CTCH onto an HS-PDSCH, to transmit the scheduling information at the paging specific occasion location, and to transmit the data of the corresponding group of UEs according to an SFN corresponding to the CFN number of the data;

Where the paging specific occasion location is the nearest one of respective paging specific occasion locations determined in Equation 4 to the current paging specific occasion location; and the CFN number corresponding to the data of the group of UEs is any CFN number in a length of time specified by the corresponding scheduling information; and The NB transmits an HS-PDSCH channel resource corresponding to the data of the group of UEs, over an HS-SCCH scrambled by a group specific H-RNTI, and transmits the scheduling information over the HS-PDSCH, at the corresponding SFN according to the CFN information corresponding to the scheduling information in the FP frame; and transmits resource information of the HS-PDSCH over the HS-SCCH scrambled by the group specific H-RNTI, and transmits the data of the group of UEs over the HS-PDSCH, at the corresponding SFN according to the CFN information corresponding to the data of the group of UEs in the FP frame.

II. In an LTE system, the radio access network includes an MME and an NB; and

The MME transmits the received data of the at least one group of UEs from the core network to the NB; and the NB transmits the data of the at least one group of UEs and corresponding scheduling information to the UE over a Group Traffic Channel (GTCH).

Particularly the NB receives a message forwarded by the MME from the core network to request for initiating group-cast, where the message includes information to instruct the data to be transmitted over the shared resource, information to identify the group, and the data of the at least one group of UEs.

In a first detection approach, the group-cast data is scheduled dynamically for transmission over a PDCCH.

For data of one group of UEs, the NB maps the GTCH onto a PDSCH, transmits a PDSCH channel resource corresponding to the data of the group of UEs over a PDCCH scrambled by a G-RNTI, and transmits the scheduling information over the PDSCH, at a GTCH occasion corresponding to the group of UEs, and transmits resource information of the PDSCH over the PDCCH scrambled by the G-RNTI, and transmits the data of the group of UEs over the PDSCH corresponding to the resource information, on a GTCH occasion indicated by the scheduling information.

In a second detection approach, the group-cast data is transmitted over a fixed resource.

For data of one group of UEs, the NB maps the GTCH to a GCH, maps the GCH to a PGCH at an instance of time when the GCH is transmitted (determined in Equation 6), and transmits the data of the at least one group of UEs and the corresponding scheduling information to the UEs over the PGCH.

Based upon the same inventive idea, an embodiment of the disclosure further provides a method for receiving data by a UE, and since the method corresponds to the UE in a system for transmitting data, and the method addresses the problem under a similar principle to the r UE in a system for transmitting data, reference can be made to the implementation of the UE for an implementation of the method, and a repeated description thereof will be omitted here.

Figure 16:
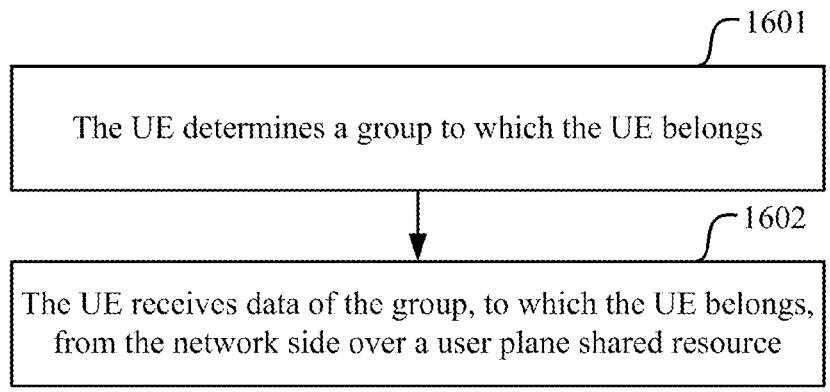
FIG. 16 illustrates a schematic flow chart of a method for receiving data by a UE according to an embodiment of the disclosure.

As illustrated in FIG. 16, a method for receiving data by a UE according to an embodiment of the disclosure includes the following operations:

In the operation 1601, the UE determines a group to which the UE belongs; and In the operation 1602, the UE receives data of the group, to which the UE belongs, from the network side over a user plane shared resource.

I. UMTS System:

In a first transmission approach, CTCH data is transmitted over a fixed HS-PDSCH resource, and scheduling information is received as triggered by a paging message.

The UE determines a paging specific occasion location and a PI location according to the group identifier of the group to which the UE belongs and receives an MAC-ehs PDU at the paging specific occasion location and the PI location; and The UE detects an HS-PDSCH channel for scheduling information according to a broadcast timing relationship and fetches the data of the group, to which the UE belongs, in one scheduling periodicity according to the received scheduling information upon determining that the received MAC-ehs PDU includes indication information that a subsequent payload is data of a CTCH channel.

In a second transmission approach, CTCH data is transmitted over a fixed HS-PDSCH resource, and scheduling information is detected periodically.

The UE determines a group specific occasion in Equation 4 and receives the scheduling information on the group specific occasion; and The UE detects an HS-PDSCH configured on a CTCH occasion continuously for a length of time specified by the scheduling information and receives the data of the group, to which the UE belongs, over the HS-PDSCH.

In a third transmission approach, CTCH data is transmitted over an HS-PDSCH resource scheduled by an HS-SCCH, and scheduling information is received as triggered by a paging message.

The UE determines a paging specific occasion location and a PI location according to the group identifier of the group to which the UE belongs and receives an MAC-ehs PDU at the paging specific occasion location and the PI location; and The UE receives control information of an HS-SCCH scrambled by a group specific H-RNTI according to a broadcast timing relationship, receives the scheduling information over an HS-PDSCH according to the control information of the HS-SCCH, and fetches the data of the group, to which the UE belongs, in one scheduling periodicity of the HS-PDSCH continuously according to the received scheduling information upon determining that the received MAC-ehs PDU includes indication information that a subsequent payload is data of a CTCH channel.

In a fourth transmission approach, CTCH data is transmitted over an HS-PDSCH resource scheduled by an HS-SCCH, and scheduling information is detected periodically.

The UE determines a group specific occasion in Equation 4 and receives the scheduling information over the HS-PDSCH by detecting an HS-SCCH scrambled by a group specific H-RNTI on the group specific occasion; and detects an HS-SCCH scrambled by the group specific H-RNTI continuously for a length of time specified by the scheduling information and receives the data of the group, to which the UE belongs, over the HS-PDSCH.

In the first and third transmission approaches, the UE receives the MAC-ehs PDU by a group specific PI at the paging specific occasion location and the PI location; or receives pre-configured HS-DSCH data including the MAC-ehs PDU on a group specific occasion at the paging specific occasion location and the PI location; or receives the HS-PDSCH including the MAC-ehs PDU, over an HS-SCCH scrambled by a group specific H-RNTI, by the group specific PI or on the group specific occasion at the paging specific occasion location and the PI location.

II. LTE System:

In a first detection approach, the group-cast data is scheduled dynamically for transmission over a PDCCH.

The UE detects a PDCCH scrambled by a G-RNTI in a specific sub-frame in a length of time specified by the scheduling information, and receives the data of the group, to which the UE belongs, over the PDSCH; or the UE detects the PDCCH scrambled by the G-RNTI continuously for the length of time specified by the scheduling information and receives the data of the group, to which the UE belongs, over the PDSCH, where the UE determines the specific sub-frame in Equation 5.

In a second detection approach, the group-cast data is transmitted over a fixed resource.

The UE receives the data of the group, to which the UE belongs, over a PGCH in a length of time specified by scheduling information upon reception of the scheduling information on a group specific GTCH occasion.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting data, comprising:
receiving, by a radio access network, data of at least one group of User Equipments, UEs, from a core network; and
transmitting, by the radio access network, data of a group to UEs in a corresponding group over a user plane shared resource;
wherein in an LTE system, the data of the group to which the UE belongs, is received by the UE over the user plane shared resource as follows:
receiving, by the UE, scheduling information over a PDSCH resource scheduled by a PDCCH channel; and
detecting, by the UE, a PDCCH scrambled by a G-RNTI in a specific sub-frame in a length of time specified by the scheduling information, and receiving the data of the group, to which the UE belongs, over the PDSCH; or detecting, by the UE, the PDCCH scrambled by the G-RNTI continuously for the length of time specified by the scheduling information and receiving the data of the group, to which the UE belongs, over the PDSCH.

2. The method of claim 1, wherein in a Long Term Evolution, LTE, system, the radio access network includes a Mobility Management Entity, MME, and a Node B (NB); and
after receiving, by the radio access network, the data of the at least one group of UEs from the core network, and before transmitting, by the radio access network, the data of the group to the UEs in the corresponding group over the user plane shared resource, the method further comprises:
transmitting, by the MME, the received data of the at least one group of UEs from the core network to the NB; and
transmitting, by the radio access network, the data of the group to the UEs in the corresponding group over the user plane shared resource comprises:
transmitting, by the NB, the data of the at least one group of UEs and corresponding scheduling information to the UE over a Group Traffic Channel, GTCH.

3. A method for transmitting data, comprising:
determining, by a UE, a group to which the UE belongs; and
receiving, by the UE, data of the group, to which the UE belongs, from the network side over a user plane shared resource;
wherein in an LTE system, receiving, by the UE, the data of the group, to which the UE belongs, from the network side over the user plane shared resource comprises:
receiving, by the UE, scheduling information over a PDSCH resource scheduled by a PDCCH channel; and
detecting, by the UE, a PDCCH scrambled by a Group Radio Network Temporary Identity (G-RNTI) in a specific sub-frame in a length of time specified by the scheduling information, and receiving the data of the group, to which the UE belongs, over the PDSCH; or detecting, by the UE, the PDCCH scrambled by the G-RNTI continuously for the length of time specified by the scheduling information and receiving the data of the group, to which the UE belongs, over the PDSCH.

4. The method of claim 3,
wherein the UE determines the specific sub-frame in the equation of:

$$\text{SystemFrameNumber (SFN)}=(K+m*N) \text{ or}$$
$$\text{SFN}=m*N+(\text{Group\_ID} \bmod N),$$

wherein K represents an offset of a Cell Broadcast Service (CBS) frame, N represents a periodicity, of a PDCCH occasion, in a unit of radio frame, m represents zero or a positive integer satisfying M*N+(Group_ID mod N)≤MaxSFN, and the Group_ID represents the identifier of the group.

5. A radio access network device for transmitting data, comprising:
a first receiving module configured to receive data of at least one group of UEs from a core network; and
a transmitting module configured to transmit data of a group to UEs in a corresponding group over a user plane shared resource;

wherein in an LTE system, the data of the group to which the UE belongs, is received by the UE over the user plane shared resource as follows:

receiving, by the UE, scheduling information over a PDSCH resource scheduled by a PDCCH channel; and detecting, by the UE, a PDCCH scrambled by a G-RNTI in a specific sub-frame in a length of time specified by the scheduling information, and receiving the data of the group, to which the UE belongs, over the PDSCH; or detecting, by the UE, the PDCCH scrambled by the G-RNTI continuously for the length of time specified by the scheduling information and receiving the data of the group, to which the UE belongs, over the PDSCH.

6. The radio access network device of claim 5, wherein in an LTE system, the radio access network device is a Node B (NB);

the first receiving module is configured:

to receive and transmit to the NB the data of the at least one group of UEs, from the core network, transmitted by an MME; and the transmitting module is configured:

to transmit the data of the at least one group of UEs and corresponding scheduling information to the UEs over a GTCH.

7. A UE for transmitting data, comprising:

a determining module configured to determine a group to which the UE belongs; and a second receiving module configured to receive data of the group, to which the UE belongs, from the network side over a user plane shared resource;

wherein in an LTE system, the second receiving module is configured:

to receive scheduling information over a PDSCH resource scheduled by a PDCCH channel, to detect a PDCCH scrambled by a Group Radio Network Temporary Identity (G-RNTI) in a specific sub-frame in a length of time specified by the scheduling information, and to receive the data of the group, to which the UE belongs, over the PDSCH; or to detect the PDCCH scrambled by the G-RNTI continuously for the length of time specified by the scheduling information and to receive the data of the group, to which the UE belongs, over the PDSCH.

8. The UE of claim 7, wherein the UE determines the specific sub-frame in the equation of:

SystemFrameNumber (SFN)=$(K+m*N)$ or
SFN=$m*N$+(Group_ID mod $N$), wherein K represents an offset of a Cell Broadcast Service (CBS) frame, N represents a periodicity, of a PDCCH occasion, in a unit of radio frame, m represents zero or a positive integer satisfying M*N+(Group_ID mod N)≤MaxSFN, and the Group_ID represents the identifier of the group.

9. The method of claim 2, wherein after receiving, by the radio access network, the data of the at least one group of UEs from the core network, and before transmitting, by the radio access network, the data of the group to the UEs in the corresponding group over the user plane shared resource, the method further comprises:

receiving, by the NB, a message forwarded by the MME from the core network to request for initiating group-cast, wherein the message comprises information to instruct the data to be transmitted over the shared resource, information to identify the group, and the data of the at least one group of UEs.

10. The method of claim 2, wherein transmitting, by the NB, the data of the at least one group of UEs and the corresponding scheduling information to the UE over the GTCH comprises:

for data of one group of UEs, mapping, by the NB, the GTCH onto a Physical Downlink Shared Channel, PDSCH, transmitting a PDSCH channel resource corresponding to the data of the group of UEs over a Physical Downlink Control Channel, PDCCH, scrambled by a Group-Radio Network Temporary Identity, G-RNTI, and transmitting the scheduling information over the PDSCH, at a Group Traffic Channel, GTCH, occasion corresponding to the group of UEs, and transmitting resource information of the PDSCH over the PDCCH scrambled by the G-RNTI, and transmitting the data of the group of UEs over the PDSCH corresponding to the resource information, on a GTCH occasion indicated by the scheduling information.

11. The method of claim 2, wherein transmitting, by the NB, the data of the at least one group of UEs and the corresponding scheduling information to the UE over the GTCH comprises:

for data of one group of UEs, mapping, by the NB, the GTCH to a Group Channel (GCH), mapping the GCH to a Physical Group Channel, PGCH, according to a moment when the GCH is transmitted, and transmitting the data of the at least one group of UEs and the corresponding scheduling information to the UEs over the PGCH.

12. The radio access network device of claim 6, wherein the first receiving module is configured:

to receive a message forwarded by the MME from the core network to request for initiating group-cast, wherein the message comprises information to instruct the data to be transmitted over the shared resource, information to identify the group, and the data of the at least one group of UEs.

13. The radio access network device of claim 6, wherein the transmitting module is configured:

for data of one group of UEs, to map the GTCH onto a PDSCH, to transmit a PDSCH channel resource corresponding to the data of the group of UEs over a PDCCH scrambled by a G-RNTI, and transmit the scheduling information over the PDSCH, at a GTCH occasion corresponding to the group of UEs, and to transmit resource information of the PDSCH over the PDCCH scrambled by the G-RNTI, and transmit the data of the group of UEs over the PDSCH corresponding to the resource information, on a GTCH occasion indicated by the scheduling information.

14. The radio access network device of claim 6, wherein the transmitting module is configured:

for data of one group of UEs, to map the GTCH to a GCH, to map the GCH to a PGCH according to a moment when the GCH is transmitted, and to transmit the data of the at least one group of UEs and the corresponding scheduling information to the UEs over the PGCH.

* * * * *